United States Patent
Sudo

(10) Patent No.: US 12,073,855 B2
(45) Date of Patent: Aug. 27, 2024

(54) MAGNETIC DISK DEVICE AND CONTROL METHOD

(71) Applicants: Kabushiki Kaisha Toshiba, Tokyo (JP); Toshiba Electronic Devices & Storage Corporation, Tokyo (JP)

(72) Inventor: Daisuke Sudo, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 18/169,629

(22) Filed: Feb. 15, 2023

(65) Prior Publication Data
US 2024/0105216 A1  Mar. 28, 2024

(30) Foreign Application Priority Data

Sep. 22, 2022 (JP) ................. 2022-151633

(51) Int. Cl.
*G11B 19/28* (2006.01)
*G11B 5/012* (2006.01)
*G11B 20/10* (2006.01)

(52) U.S. Cl.
CPC .............. *G11B 5/012* (2013.01); *G11B 19/28* (2013.01); *G11B 20/10481* (2013.01)

(58) Field of Classification Search
CPC ... G11B 27/36; G11B 20/12; G11B 20/10222; G11B 20/18; G11B 2020/02; G11B 15/02; G11B 15/09; G11B 15/005; G11B 15/442; G11B 15/46; G11B 5/54; G11B 19/28; G11B 5/56; G11B 5/3103; G11B 2005/0005; G11B 5/1278; G11B 20/1217; G11B 5/315; G11B 5/012; G11B 5/6005; G11B 5/5526; G11B 5/3116; G11B 5/187; G11B 21/083; G11B 2020/108098; G11B 2005/0024
USPC .......................................... 360/73.08, 73.01
See application file for complete search history.

(56) References Cited

U.S. PATENT DOCUMENTS 5,926,453 A * 7/1999 Muramatsu .......... G11B 7/0079
386/E5.064
2010/0125703 A1   5/2010 Horiguchi

FOREIGN PATENT DOCUMENTS

JP   H10-92101 A    4/1998
JP   2010-123154 A  6/2010

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a magnetic disk, a motor, a magnetic head, and a controller. A first area, and a second area located on an inner diameter side of the first area are provided in the magnetic disk. The motor rotates the magnetic disk. The controller receives a write command. In a case where a first position that is a position designated as a write destination of data by the write command is included in the first area, the controller writes the data to the first position by the magnetic head while rotating the magnetic disk at a rotational speed of a first value. In a case where the first position is included in the second area, the controller writes the data to the first position by the magnetic head while rotating the magnetic disk at a rotational speed of a second value larger than the first value.

19 Claims, 20 Drawing Sheets

FIG.4

| POWER MODE | HIGH-SPEED ROTATION MODE ||||| NORMAL ROTATION MODE |||||
|---|---|---|---|---|---|---|---|---|---|---|
| | ROTATIONAL SPEED OF SPM | HEAD POSITION | WRITING TO RESTRICTED AREA | WRITING TO NON-RESTRICTED AREA | READING | ROTATIONAL SPEED OF SPM | HEAD POSITION | WRITING TO RESTRICTED AREA | WRITING TO NON-RESTRICTED AREA | READING |
| ACTIVE | HIGH SPEED | Flying | IMPOSSIBLE | POSSIBLE | POSSIBLE | NORMAL | Flying | POSSIBLE | POSSIBLE | POSSIBLE |
| RESTORATION | N/A | N/A | N/A | N/A | N/A | NORMAL | Flying | POSSIBLE | POSSIBLE | POSSIBLE |
| FIRST IDLE | HIGH SPEED | Flying | IMPOSSIBLE | IMPOSSIBLE | IMPOSSIBLE | NORMAL | Flying | IMPOSSIBLE | IMPOSSIBLE | IMPOSSIBLE |
| SECOND IDLE | HIGH SPEED | Park | IMPOSSIBLE | IMPOSSIBLE | IMPOSSIBLE | NORMAL | Park | IMPOSSIBLE | IMPOSSIBLE | IMPOSSIBLE |
| THIRD IDLE | LOW SPEED | Park | IMPOSSIBLE | IMPOSSIBLE | IMPOSSIBLE | LOW SPEED | Park | IMPOSSIBLE | IMPOSSIBLE | IMPOSSIBLE |
| STANDBY | STOPPED | Park | IMPOSSIBLE | IMPOSSIBLE | IMPOSSIBLE | STOPPED | Park | IMPOSSIBLE | IMPOSSIBLE | IMPOSSIBLE |

MAGNETIC DISK DEVICE AND CONTROL METHOD

CROSS-REFERENCE TO RELATED APPLICATIONS

This application is based upon and claims the benefit of priority from Japanese Patent Application No. 2022-151633, filed on Sep. 22, 2022; the entire contents of which are incorporated herein by reference.

FIELD

Embodiments described herein relate generally to a magnetic disk device and a control method.

BACKGROUND

In general, as a rotational speed of a magnetic disk becomes higher, rotational latency becomes smaller and reading and writing performance tends to be higher.

However, a recording frequency, that is, an amount of data that can be written per unit time has an upper limit according to a characteristic of a magnetic head. Since the recording frequency depends on the rotational speed and linear recording density of the magnetic disk, that is, recording density per unit length in a circumferential direction, when the rotational speed of the magnetic disk is set to be high, storage capacity of a magnetic disk device may decrease.

BRIEF DESCRIPTION OF THE DRAWINGS

FIG. 4 is a view for describing a state in each rotation mode according to the first embodiment;

DETAILED DESCRIPTION

According to the present embodiment, a magnetic disk device includes a magnetic disk, a motor, a magnetic head, and a controller. A first area, and a second area located on an inner diameter side of the first area are provided in the magnetic disk. The motor rotates the magnetic disk. The controller receives a write command. In a case where a first position that is a position designated as a write destination of data by the write command is included in the first area, the controller writes the data to the first position by the magnetic head while rotating the magnetic disk at a rotational speed of a first value. In a case where the first position is included in the second area, the controller writes the data to the first position by the magnetic head while rotating the magnetic disk at a rotational speed of a second value larger than the first value.

In the following, a magnetic disk device and a control method according to embodiments will be described in detail with reference to the accompanying drawings. Note that the present invention is not limited to these embodiments.

First Embodiment

Figure 1:
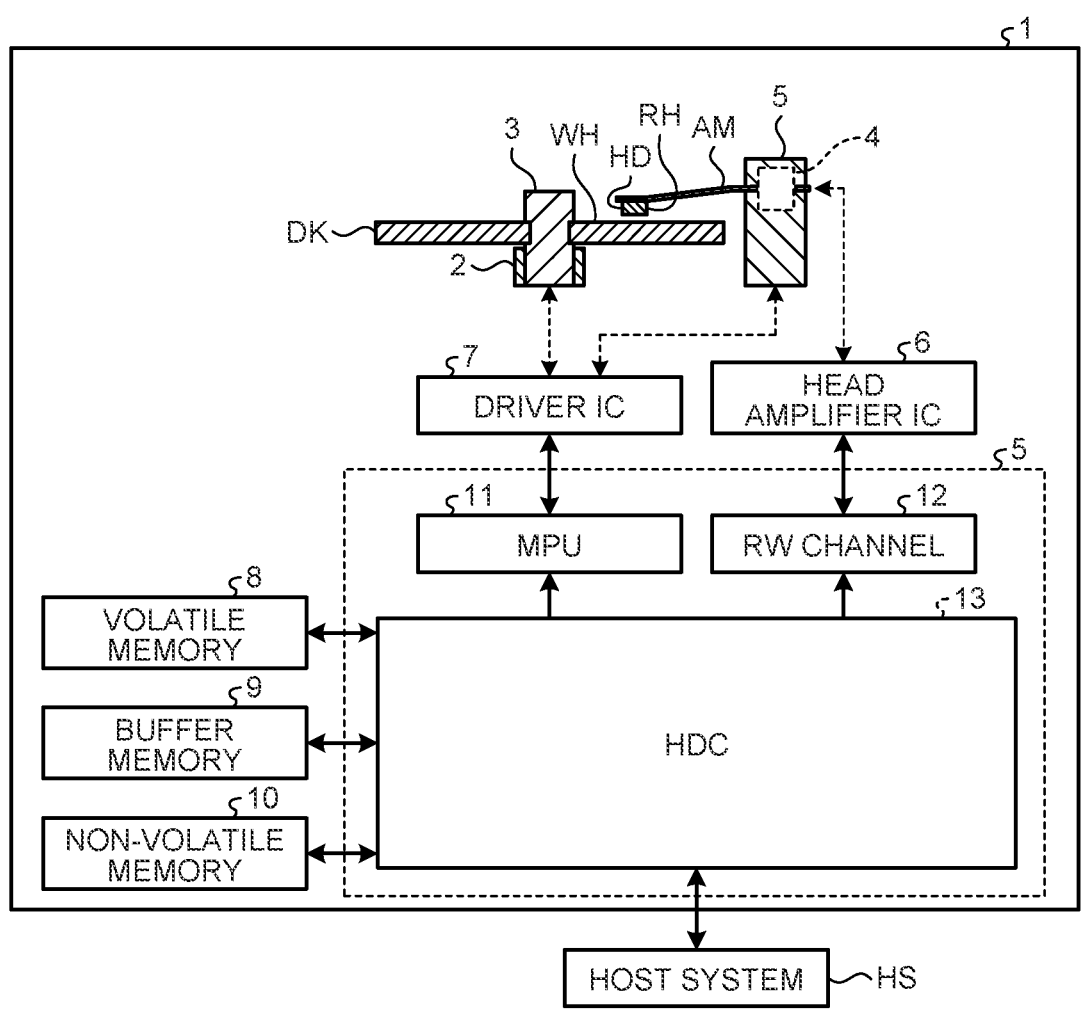
FIG. 1 is a block diagram illustrating an example of a configuration of a magnetic disk device according to a first embodiment.

FIG. 1 is a block diagram illustrating an example of a configuration of a magnetic disk device according to the first embodiment. A magnetic disk device 1 can be connected to a host system HS, and functions as an external storage device of the host system HS. The host system HS is, for example, a central processing unit (CPU) or the like.

The host system HS issues an access command to the magnetic disk device 1. The access command includes a write command and a read command. The access command includes address information indicating a position of an access destination. That is, the host system HS designates the position of the access destination by the address information. In one example, the address information is a logical address.

The magnetic disk device 1 includes a magnetic disk DK, a spindle motor (SPM) 2, a magnetic head HD, an actuator arm AM, a voice coil motor (VCM) 4, a system-on-a-chip (SoC) 5, a head amplifier integrated circuit (IC) 6, a driver IC 7, a volatile memory 8, a buffer memory 9, and a non-volatile memory 10. The SoC 5 includes a microprocessing unit (MPU) 11, a read-write (RW) channel 12, and a hard disk controller (HDC) 13.

The magnetic disk DK is a disk-shaped recording medium capable of recording various kinds of information. The magnetic disk DK is rotated about a shaft 3 by the SPM 2 provided on the shaft 3.

Although the magnetic disk device 1 including one magnetic disk DK is illustrated in FIG. 1, the number of magnetic disks DK included in the magnetic disk device 1 is not limited to one. A plurality of magnetic disks DK may be included in one magnetic disk device 1. In a case where the plurality of magnetic disks DK is included in the one magnetic disk device 1, the plurality of magnetic disks DK is integrally rotated.

The SPM 2 is provided coaxially with the magnetic disk DK. Thus, hereinafter, it is assumed that the rotational speed of the magnetic disk DK and the rotational speed of the SPM 2 are synonymous.

The magnetic head HD is provided at one end of the actuator arm AM, and executes access to the magnetic disk DK, that is, writing and reading of data. The magnetic head HD includes a write head WH that writes data to the magnetic disk DK, and a read head RH that reads data from the magnetic disk DK. The magnetic head HD moves in a down-track direction relative to a surface of the magnetic disk DK while maintaining a state of slightly floating from the surface of the magnetic disk DK by lift generated by the rotation of the magnetic disk DK.

The VCM 4 is provided at an end of the actuator arm AM which end is on an opposite side of the end where the magnetic head HD is provided. The VCM 4 rotationally drives the actuator arm AM around a shaft 5. As a result, the VCM 4 moves the magnetic head HD in a cross-track direction relative to the magnetic disk DK.

The non-volatile memory 10 is a memory that stores a firmware program executed by the MPU 11. The non-volatile memory 10 can be also used as a saving destination of user data at the time of power-off. Note that a type of the non-volatile memory 10 is not limited to a specific type. As the non-volatile memory 10, for example, a flash memory can be applied.

The volatile memory 8 provides a work area to the SoC 5. Specifically, at the time of activation of the magnetic disk device 1, the firmware program is loaded from the non-volatile memory 10 to the volatile memory 8, and various parameters are loaded from a system area of the magnetic disk DK to the volatile memory 8. The MPU 11 executes various kinds of processing on the basis of the firmware program and various parameters in the volatile memory 8.

Furthermore, in the volatile memory 8, a command queue in which a command received from the host system HS is stored (command queue 21 described later) is allocated. The HDC 13 stores the command received from the host system HS in the command queue 21, and sequentially processes the one or more commands in the command queue 21.

Note that a type of the volatile memory 8 is not limited to a specific type. For example, a dynamic random access memory (DRAM), a static random access memory (SRAM), or a combination thereof may be used as the volatile memory 8.

In the buffer memory 9, transfer data between the host system HS and the magnetic disk DK is stored and buffered. Specifically, the buffer memory 9 holds, among pieces of write data received from the host system HS, write data that is not yet written to the magnetic disk DK.

Note that a type of the buffer memory 9 is not limited to a specific type. For example, a DRAM, an SRAM, or a combination thereof may be used as the buffer memory 9. A storage area as the buffer memory 9 may be allocated in the volatile memory 8.

The head amplifier IC 6 writes data to the magnetic disk DK by causing a write signal (current) corresponding to data input from the RW channel 12 to flow to the write head WH. In addition, the head amplifier IC 6 amplifies a read signal output from the read head RH (data read from the magnetic disk DK by the read head RH), and supplies the amplified read signal to the RW channel 12.

The RW channel 12 code-modulates the data stored in the buffer memory 9 and outputs the code-modulated data to the head amplifier IC 6. In addition, the RW channel 12 performs code demodulation of the data transmitted from the head amplifier IC 6, and outputs the code-demodulated user data to the buffer memory 9.

The HDC 13 sequentially processes the one or more commands stored in the command queue 21 in the volatile memory 8. In a case where a plurality of commands is stored in the command queue 21, the HDC 13 can execute command reordering. The command reordering is operation of determining processing order of a plurality of commands without depending on order of reception from the host system HS in such a manner that the time required for processing of the plurality of commands becomes as short as possible.

In addition, the HDC 13 receives data, which corresponds to the write command and is to be written, from the host system HS together with the write command. The HDC 13 stores the received data to be written in the buffer memory 9. When processing order of the write command associated with the data to be written comes, the data to be written is sent to the RW channel 12.

When processing order of the read command comes, the HDC 13 acquires data, which corresponds to the read command and is to be read via the RW channel 12, and stores the acquired data to be read in the buffer memory 9. Then, the HDC 13 transmits the data to be read in the buffer memory 9 to the host system HS.

The MPU 11 performs overall control of the operation of the entire magnetic disk device 1 on the basis of the firmware program. The MPU 11 transmits a rotation command indicating a target rotational speed of the SPM 2 and a positioning command indicating a target position of the magnetic head HD. The driver IC 7 supplies a driving current to the SPM 2 in such a manner that the rotational speed of the SPM 2 becomes the target rotational speed instructed by the rotation command. In addition, the driver IC 7 supplies a driving current to the VCM 4 in such a manner that the magnetic head HD is located at a position instructed by the positioning command.

Note that the SoC 5 is an example of a controller of the embodiment. A controller of the embodiment is not necessarily configured as an SoC. The controller of the embodiment may include two or more chips. In addition, the controller of the embodiment may include any component (such as a volatile memory 8, a buffer memory 9, a non-volatile memory 10, and the like) in addition to the HDC 13, the MPU 11, and the RW channel 12.

The driver IC 7 controls power supply to each unit included in the magnetic disk device 1. In addition, the driver IC 7 supplies the driving current to each of the VCM 4 and the VCM 4 on the basis of a command from the MPU 11.

In the first embodiment, the HDC 13 is configured to be able to switch the operation mode of the magnetic disk device 1 among a plurality of modes. The plurality of modes includes a fixed mode and a variable mode.

The fixed mode is a mode in which the rotational speed of the magnetic disk DK at the time of disk access is fixed to one value. The disk access means reading or writing on the magnetic disk DK by the magnetic head HD.

The variable mode is a mode in which the rotational speed of the magnetic disk DK at the time of disk access is switched between a plurality of values according to the situation. Here, as an example, in the variable mode, the rotational speed at the time of disk access can be switched between a first value which is a normal rotational speed and a second value larger than the first value. Note that in the variable mode, a rotation mode in which the magnetic disk DK rotating at the rotational speed of the first value is accessed is referred to as a normal rotation mode. In the variable mode, a rotation mode in which the magnetic disk DK rotating at the rotational speed of the second value is accessed is referred to as a high-speed rotation mode. That is, in the variable mode, the rotation mode is switched between the normal rotation mode and the high-speed rotation mode.

As described above, as the rotational speed of the magnetic disk becomes higher, rotational latency becomes smaller and reading and writing performance tends to be higher. However, in a case where the rotational speed of the magnetic disk exceeds a predetermined level, the recording frequency is subjected to band limitation based on a characteristic of the write head WH. Thus, in the first embodiment, a restricted area that is a storage area in which writing in the normal rotation mode is permitted and writing in the high-speed rotation mode is prohibited is set on a recording surface of the magnetic disk DK.

The restricted area set in the magnetic disk DK will be described with reference to FIG. 2 and FIG. 3.

Figure 2:
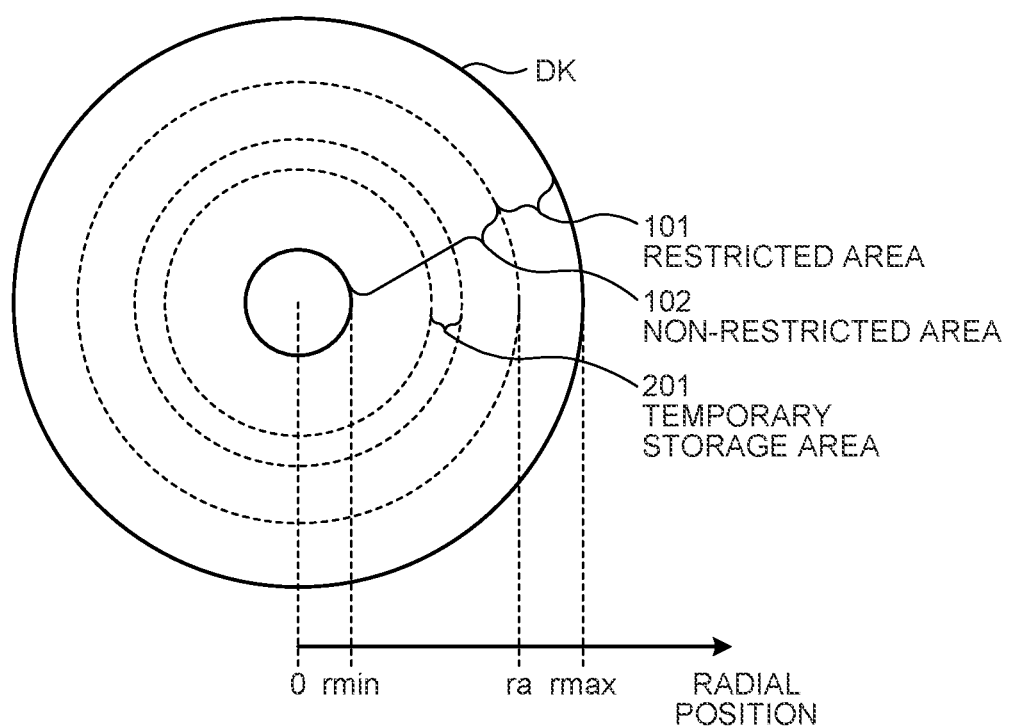
FIG. 2 is a view illustrating an example of a configuration of a magnetic disk according to the first embodiment.

FIG. 2 is a view illustrating an example of a configuration of a magnetic disk DK according to the first embodiment.

In the example illustrated in FIG. 2, data can be recorded in a range from a radial position rmin to a radial position rmax. Logical addresses are mapped in the range from the radial position rmin to the radial position rmax, and the host system HS can designate a position of an access destination by using a logical address. Note that a partial range of the logical addresses mapped on the magnetic disk DK may be set in such a manner that access from the host system HS cannot be performed. The range of the logical addresses set in such a manner that the access from the host system HS cannot be performed is used as, for example, a system area in which system data of the magnetic disk device 1 is stored.

A range from a radial position ra to the radial position rmax located on the most outer diameter side is set as the restricted area 101 in which writing in the normal rotation mode is permitted and writing in the high-speed rotation mode is prohibited. Then, a region located on an inner diameter side of the restricted area 101, that is, a range from the radial position rmin located on the most inner diameter side to the radial position ra is set as the non-restricted area 102 in which writing is permitted in both the normal rotation mode and the high-speed rotation mode.

Figure 3:
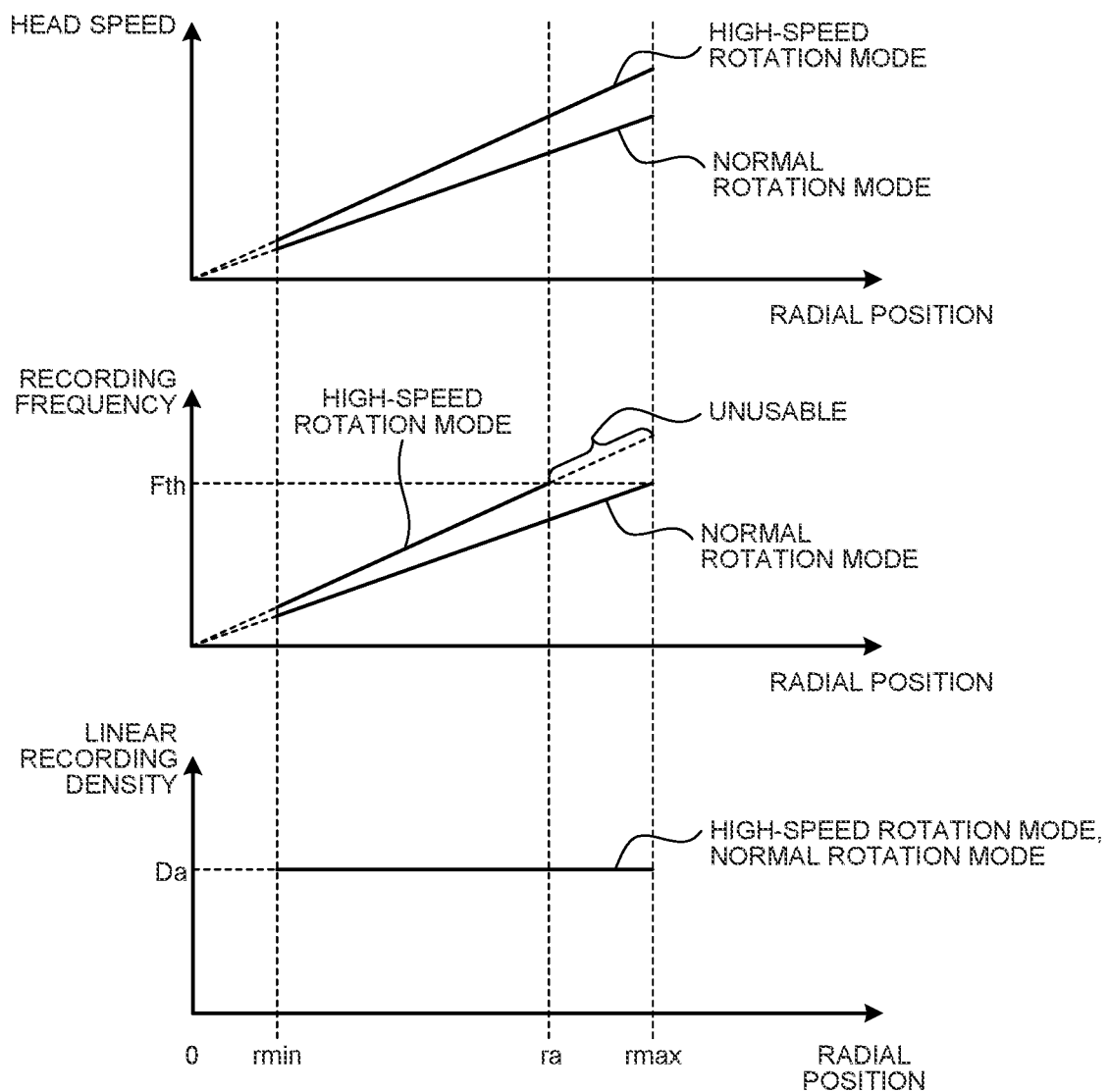
FIG. 3 is a view for describing a relationship between a radial position of the magnetic disk and various physical amounts according to the first embodiment.

FIG. 3 is a view for describing a relationship between a radial position of the magnetic disk DK and various physical amounts according to the first embodiment. In the present drawing, a graph indicating a relationship between the radial position and a relative speed of the magnetic head HD with respect to the magnetic disk DK, a graph indicating a relationship between the radial position, the magnetic head HD, and the recording frequency, and a graph indicating a relationship between the radial position and the linear recording density are illustrated. The relative speed of the magnetic head HD with respect to the magnetic disk DK is referred to as a head speed.

In a case where the head speed is v and the rotational speed of the magnetic disk DK is R [rpm], the head speed v at the radial position r is calculated by the following expression (1).

$$v = 2\pi r * R/60 \tag{1}$$

As being obvious from the expression (1), the head speed v changes linearly with respect to the radial position r. The head speed v is higher in the high-speed rotation mode than in the normal rotation mode. A difference between the head speed v in the high-speed rotation mode and the head speed v in the normal rotation mode increases toward the outer diameter side.

The linear recording density is set to a constant value Da in the range from the radial position rmin to the radial position rmax. Note that the range from the radial position rmin to the radial position rmax may be divided into a plurality of zones in the radial direction, and the linear recording density may slightly vary among the zones. However, the linear recording density of the zones are approximately Da and are set substantially equal to each other. The set linear recording density is commonly used regardless of whether the rotation mode is the normal rotation mode or the high-speed rotation mode.

As the linear recording density, for example, numerical information in units called bits per inch (BPI) can be employed. Note that the numerical information indicating the linear recording density is not limited to BPI.

Note that track density is set in the magnetic disk DK. The set track density is commonly used regardless of whether the rotation mode is the normal rotation mode or the high-speed rotation mode. As the track density, for example, numerical information in units called tracks per inch (TPI) can be employed. The numerical information indicating the track density is not limited to TPI.

The recording frequency is an amount of data that can be written per unit time. The recording frequency is, for example, a reciprocal of the shortest magnetization pattern cycle at certain linear recording density, and is determined by the linear recording density and the head speed. In a case where the linear recording density is set to the substantially constant value Da that does not depend on the radial position, the recording frequency changes linearly with respect to the head speed. Specifically, the recording frequency changes linearly with respect to the radial position r as illustrated in a middle graph in FIG. 3.

Fth is an upper limit value of a band of the recording frequency in which a recording head HD (more precisely, the write head WH) can correctly write data. For example, Fth is determined on the basis of an error rate at the time of access, that is, writing and reading to the magnetic disk DK. The recording frequency at which the error rate at the time of the access to the magnetic disk DK is equal to a predetermined allowable upper limit value is determined as Fth. When writing to the magnetic disk DK is performed at the recording frequency exceeding Fth, the error rate exceeds the allowable upper limit value, and reading data correctly becomes difficult.

In the middle graph of FIG. 3, the recording frequency reaches Fth at the radial position rmax in the normal rotation mode. Thus, in the normal rotation mode, writing can be performed without the recording frequency exceeding Fth in the range from the radial position rmin to the radial position rmax. In the high-speed rotation mode, the recording frequency reaches Fth at the radial position ra, and exceeds Fth on the outer diameter side of the radial position ra. Thus, writing in the normal rotation mode can be performed and writing in the high-speed rotation mode is prohibited in the range from the radial position ra to the radial position rmax, that is, the restricted area 101.

In such a manner, an area in which the recording frequency exceeds Fth in the high-speed rotation mode is set as the restricted area 101, and an area in which the recording frequency does not exceed Fth in the high-speed rotation mode is set as the non-restricted area 102.

Note that a method of setting the restricted area 101 is arbitrary as long as an area in which the recording frequency exceeds Fth in the high-speed rotation mode is set as the restricted area 101. For example, a restricted area 101 may be set on an outer diameter side of a radial position ra' that is a position offset on the inner diameter side of the radial position ra, and a non-restricted area 102 may be set on the inner diameter side of the radial position ra'.

As described above, the restricted area 101, and the non-restricted area 102 located on the inner diameter side of the restricted area 101 are provided in the magnetic disk DK.

Order of determination of the rotational speed at the time of disk access, the linear recording density, and the radial position ra in a boundary between the restricted area 101 and the non-restricted area 102 are arbitrary. In one example, a designer first determines the rotational speed at the time of the disk access in each of the normal rotation mode and the high-speed rotation mode. Next, the designer determines Da in such a manner that the largest amount of data can be written in a case where the data is written in the range from the radial position rmin to the radial position rmax in the normal rotation mode. That is, Da is determined in such a manner that the recording frequency becomes Fth when writing is performed at the radial position rmax in the normal rotation mode. Subsequently, the designer determines a position, at which the recording frequency reaches Fth in the high-speed rotation mode, as the radial position ra of the boundary between the restricted area 101 and the non-restricted area 102.

A technique to be compared with the first embodiment (referred to as a comparative example) will be described.

According to the comparative example, a magnetic disk device performs disk access only at a rotational speed higher than a normal rotational speed (such as the rotational speed of the second value in the first embodiment). In an area on an outer diameter side from a position at which a recording frequency reaches Fth (such as an area corresponding to the restricted area 101 of the first embodiment), linear recording density is set low (for example, lower than Da) in such a manner that the recording frequency does not exceed Fth.

That is, according to the comparative example, the linear recording density is set to be lower in some areas than in other areas in such a manner that the recording frequency does not exceed Fth. Thus, while the disk access can be performed at a high rotational speed at any radial position, storage capacity of the magnetic disk device decreases according to a decrease in linear recording density in some areas.

In the first embodiment, the magnetic disk device 1 can operate in the high-speed rotation mode and the normal rotation mode, and performs the disk access in the high-speed rotation mode in the non-restricted area 102 and performs the disk access in the normal rotation mode in the restricted area 101. This makes it possible to achieve both improvement in reading and writing performance and control of a decrease in the storage capacity of the magnetic disk.

Furthermore, in the first embodiment, in a case where a position designated as a write destination of data by the host system HS is included in the restricted area 101, the magnetic disk device 1 stores the data in a temporary storage area provided in an area in which high-speed writing can be performed. Here, as an example, as illustrated in FIG. 2, a temporary storage area (temporary storage area 201) is provided in the non-restricted area 102. That is, in a case where the position designated as the write destination of the data by the host system HS is included in the restricted area 101, the magnetic disk device 1 stores the data in the temporary storage area 201 in the non-restricted area 102 in the high-speed rotation mode. Then, when a predetermined condition including, for example, transition of a power mode of the magnetic disk device 1 to an idle state is satisfied, the magnetic disk device 1 moves the data in the temporary storage area 201 to the position designated as the write destination by the host system HS. As a result, from a viewpoint of the host system HS, writing performance is improved without depending on the write destination.

Note that the temporary storage area 201 may be allocated as a dedicated area in the non-restricted area 102. That is, the temporary storage area 201 may not be able to be designated as the write destination of the data by the host system HS.

Alternatively, the temporary storage area 201 may be temporarily allocated to an area, which can be designated as the write destination of the data by the host system HS, in the non-restricted area 102.

Hereinafter, operation of moving the data from the temporary storage area 201 to the restricted area 101 will be referred to as restoration operation. In the restoration operation, after the data is transferred from the temporary storage area 201 to the restricted area 101, the data in the transfer source in the temporary storage area 201 may be deleted or may be regarded as invalid data without being deleted. That is, the "movement" in the restoration operation in the present specification is at least to transfer data.

FIG. 4 is a view for describing a state in each rotation mode according to the first embodiment. Note that in the present drawing, with respect to the rotational speed of the SPM 2 (in other words, the rotational speed of the magnetic disk DK), a state in which the SPM 2 rotates at the rotational speed of the second value is referred to as "high speed", a state in which the SPM 2 rotates at the rotational speed of the first value is referred to as "normal", a state in which the SPM 2 rotates at a rotational speed lower than the first value is referred to as "low speed", and a state in which the SPM 2 is stopped is referred to as "stopped". Furthermore, with respect to a position of the magnetic head HD, a state in which the magnetic head HD is on the magnetic disk DK will be referred to as "Flying", and a state in which the magnetic head HD is unloaded will be referred to as "Park".

The power mode of the magnetic disk device 1 can be an active state, a restoration state, a first idle state, a second idle state, a third idle state, and a standby state.

The active state is a power mode in which operation in response to an access command from the host system HS can be performed at any time.

In a case where the magnetic disk device 1 is in the high-speed rotation mode and in the active state, the SPM 2 rotates at the rotational speed of the second value, the magnetic head HD is on the magnetic disk DK, writing to the restricted area 101 is impossible, writing to the non-restricted area 102 is possible, and reading from the restricted area 101 and the non-restricted area 102 is possible.

In a case where the magnetic disk device 1 is in the normal rotation mode and in the active state, the SPM 2 rotates at the rotational speed of the first value, the magnetic head HD is on the magnetic disk DK, and all of writing to the restricted area 101, writing to the non-restricted area 102, and reading from the restricted area 101 and the non-restricted area 102 can be performed.

The restoration state is a state in which the restoration operation is executed. The restoration operation includes writing to the restricted area 101. Thus, the restoration operation is executed in the normal rotation mode and is not executed in the high-speed rotation mode. In a case where the magnetic disk device 1 is in the restoration state, the SPM 2 rotates at the rotational speed of the first value, the magnetic head HD is on the magnetic disk DK, and all of writing to the restricted area 101, writing to the non-restricted area 102, and reading from the restricted area 101 and the non-restricted area 102 can be performed.

In the first idle state, the SPM 2 is rotated at the same rotational speed as the rotational speed of the SPM 2 in the active state, and the magnetic head HD is in a state of being located at a predetermined position at which power consumption of the VCM 4 on the magnetic disk DK becomes as small as possible. In the first idle state, all of writing to the restricted area 101, writing to the non-restricted area 102, and reading from the restricted area 101 and the non-restricted area 102 cannot be performed. The magnetic disk device 1 can quickly return from the first idle state to the active state in response to reception of a new access command from the host system HS.

In the second idle state, the SPM 2 is rotated at the same rotational speed as the rotational speed of the SPM 2 in the active state, and the magnetic head HD is in an unloaded state. In the second idle state, all of writing to the restricted area 101, writing to the non-restricted area 102, and reading from the restricted area 101 and the non-restricted area 102 cannot be performed. Since the magnetic head HD is unloaded in the second idle state, a speed of returning from the second idle state to the active state is lower than a speed of returning from the first idle state to the active state although power consumption in the second idle state is smaller than power consumption in the first idle state.

The third idle state is a state in which the SPM 2 is rotated at a rotational speed lower than the first value and the magnetic head HD is unloaded. In the third idle state, all of writing to the restricted area 101, writing to the non-restricted area 102, and reading from the restricted area 101 and the non-restricted area 102 cannot be performed. Since the rotational speed of the SPM 2 is controlled in the third idle state, a speed of returning from the third idle state to the active state is lower than the speed of returning from the second idle state to the active state although power consumption in the third idle state is smaller than the power consumption in the second idle state.

The standby state is a state in which the SPM 2 is stopped and the magnetic head HD is unloaded. In the standby state, all of writing to the restricted area 101, writing to the non-restricted area 102, and reading from the restricted area 101 and the non-restricted area 102 cannot be performed. Although power consumption in the standby state is smaller than the power consumption in any of the above states, it takes a lot of time to return from the standby state to the active state.

Figure 5:
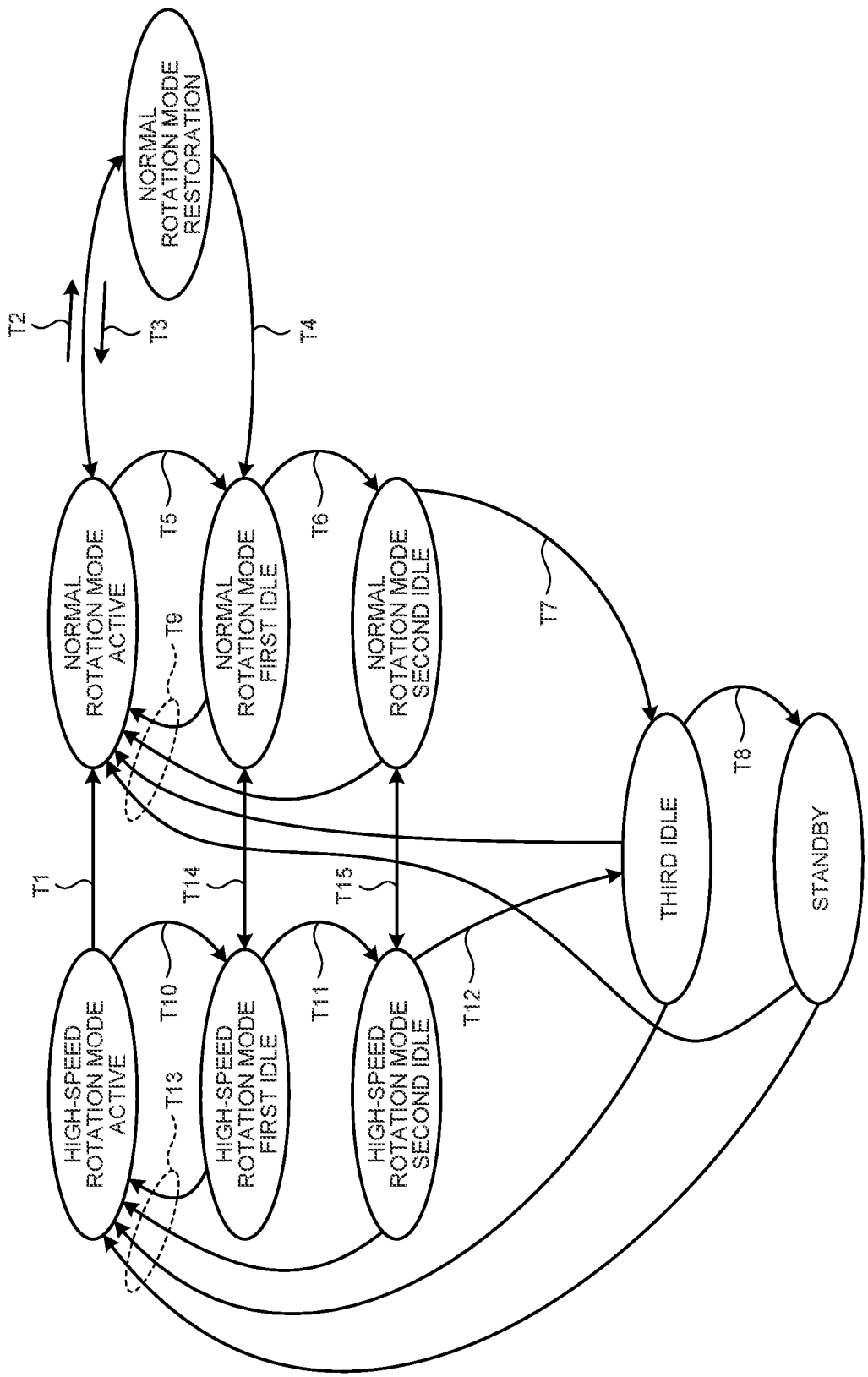
FIG. 5 is a schematic diagram illustrating an example of a state transition of a magnetic disk device according to the first embodiment.

FIG. 5 is a schematic diagram illustrating an example of a state transition of the magnetic disk device 1 according to the first embodiment;

In a case of being in the active state of the high-speed rotation mode, the magnetic disk device 1 may transition to the active state of the normal rotation mode when free capacity of the temporary storage area 201 becomes small (T1). In a case where there is no unprocessed command and there is data in the temporary storage area 201, the magnetic disk device 1 in the active state of the normal rotation mode may transition from the active state of the normal rotation mode to the restoration state (T2). The magnetic disk device 1 in the restoration state executes the restoration operation.

When receiving a new command from the host system HS, the magnetic disk device 1 in the restoration state may transition to the active state of the normal rotation mode (T3). When the restoration operation of all the data in the temporary storage area 201 is completed, the magnetic disk device 1 in the restoration state may transition to the first idle state of the normal rotation mode (T4).

In a case where there is no unprocessed command and there is no data in the temporary storage area 201, the magnetic disk device 1 in the active state of the normal rotation mode may transition to the first idle state of the normal rotation mode (T5). The magnetic disk device 1 in the first idle state of the normal rotation mode may transition to the second idle state, the third idle state, and the standby state according to a time length in which the state with no unprocessed command continues (T6, T7, and T8).

In the normal rotation mode, when receiving a new command from the host system HS, the magnetic disk device 1 in the first idle state, the second idle state, the third idle state, or the standby state may transition to the active state of the normal rotation mode (T9).

The magnetic disk device 1 in the active state of the high-speed rotation mode may transition to the first idle state, the second idle state, the third idle state, and the standby state according to the time length in which the state with no unprocessed command continues (T10, T11, T12, and T8). In the high-speed rotation mode, when receiving a new command from the host system HS, the magnetic disk device 1 in the first idle state, the second idle state, the third idle state, or the standby state can transition to the active state of the high-speed rotation mode (T13).

The transition between the high-speed rotation mode and the normal rotation mode is also possible in the first idle state and the second idle state.

Note that the path of the state transition and the transition trigger condition described above are merely examples. It may be configured that transition between arbitrary two states can be performed in a path not illustrated in FIG. 5. In addition, the trigger condition of the transition between the states may be slightly different from the trigger condition described above. In addition, the magnetic disk device 1 may be configured to be able to receive a command designating a power mode from the host system HS, and may be configured to transition to the power mode designated by the host system HS in response to the command.

Note that a setting of the operation mode, a setting of the rotation mode, and a setting of the power mode are stored in the volatile memory 8, the non-volatile memory 10, the buffer memory 9, or any other arbitrary position by any component in the SoC 5. In one example, the setting of the operational mode, the setting of the rotation mode, and the setting of the power mode are stored at these positions by the HDC 13, and these stored settings are updated by the HDC 13. The operation mode is set by a manufacturer at the time of manufacturing in one example. Alternatively, the operation mode is set by an instruction from the host system HS. Switching of the rotation mode and switching of the power mode are executed by any component in the SoC 5. In one example, switching of the rotation mode and switching of the power mode are executed by the HDC 13.

Next, an operation and a flow of data in each operation mode will be described. Here, as an example, a case where a write command is received from the host system HS will be described.

Figure 6:
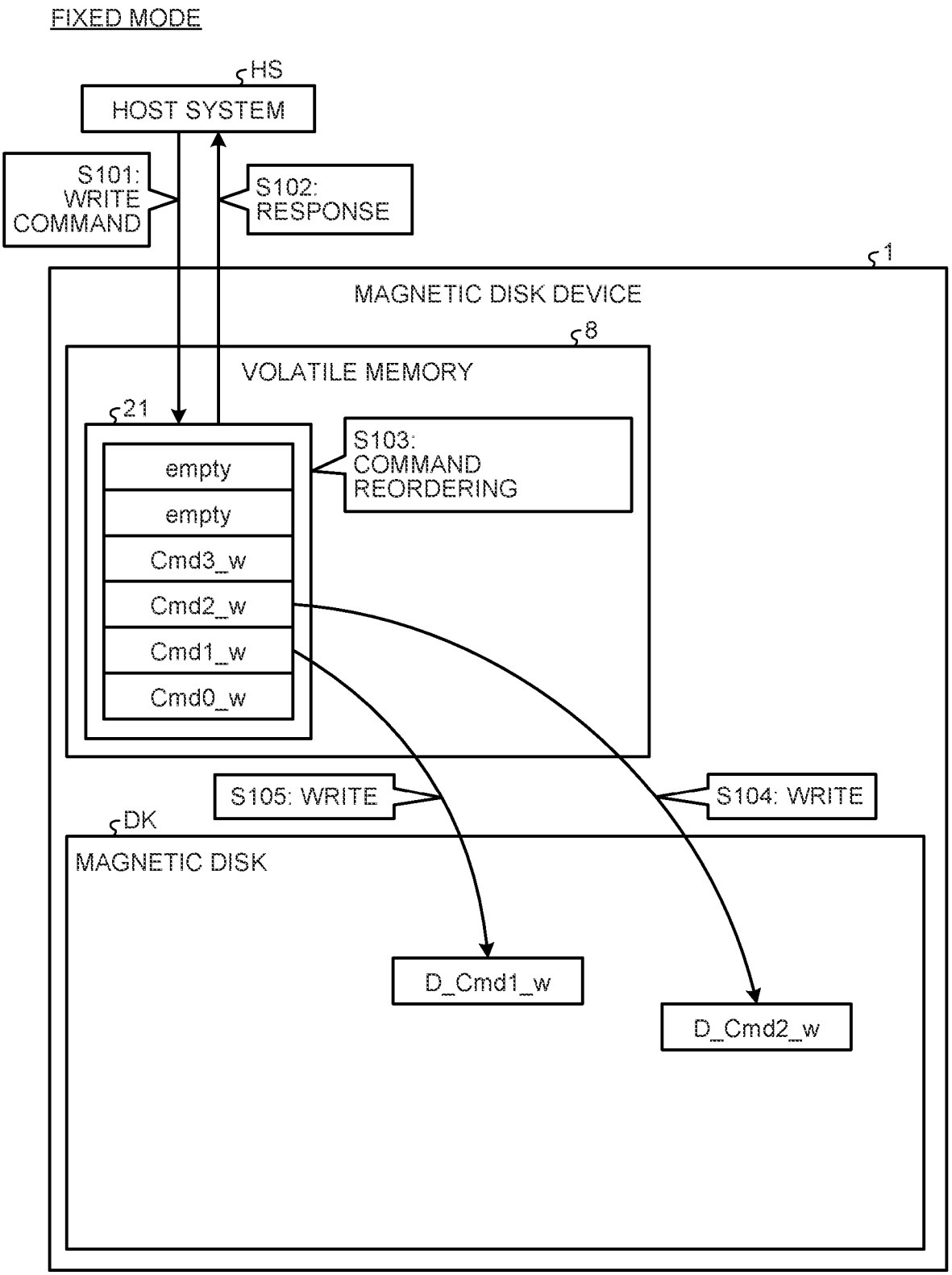
FIG. 6 is a schematic diagram illustrating an example of operation in a fixed mode of the magnetic disk device according to the first embodiment.

FIG. 6 is a schematic diagram illustrating an example of an operation in a fixed mode of the magnetic disk device 1 according to the first embodiment.

In the magnetic disk device 1, when receiving a write command from the host system HS, the HDC 13 stores the write command in the command queue 21 in the volatile memory 8 (S101). Note that the HDC 13 receives data, which corresponds to the write command and is to be written, from the host system HS and stores the received data to be written in the buffer memory 9. In the following description, description of the operation of receiving the data to be written from the host system HS and storing the data in the buffer memory 9 may be omitted.

When the storage of the write command into the command queue 21 and the storage of the data to be written into the buffer memory 9 are completed, the HDC 13 gives a response indicating completion of the writing to the host system HS (S102).

In the example illustrated in FIG. 6, four write commands, that is, a command Cmd0_w, a command Cmd1_w, a command Cmd2_w, and a command Cmd3_w are stored in the command queue 21. The HDC 13 sequentially selects a command to be processed from the command Cmd0_w, the command Cmd1_w, the command Cmd2_w, and the command Cmd3_w by executing command reordering (S103). In the command reordering in S103, the HDC 13 calculates time necessary for seek operation on the basis of the position of the write destination, and sequentially selects the commands to be processed in such a manner that the calculated time becomes as short as possible. The SoC 5 sequentially executes the selected commands.

Here, as an example, first, the command Cmd2_w is selected, and writing of data to be written D_Cmd2_w, which data corresponds to the command Cmd2_w, to the magnetic disk DK is executed (S104). The write destination of the data D_Cmd2_w is a position indicated by a logical address included in the command Cmd2_w.

The command Cmd1_w is selected following the command Cmd2_w, and writing of data to be written D_Cmd1_w, which data corresponds to the command Cmd1_w, to the magnetic disk DK is executed (S105). The write destination of the data D_Cmd1_w is a position indicated by a logical address included in the command Cmd1_w.

Note that the disk access is executed while the magnetic disk DK is in a state of being rotated at the rotational speed of the first value in the fixed mode, for example. The rotational speed of the magnetic disk DK in the fixed mode is not limited to the above. The designer can set an arbitrary value as the rotational speed of the magnetic disk DK at the time of the disk access in the fixed mode as long as the rotational speed is equal to or lower than the first value.

Figure 7:
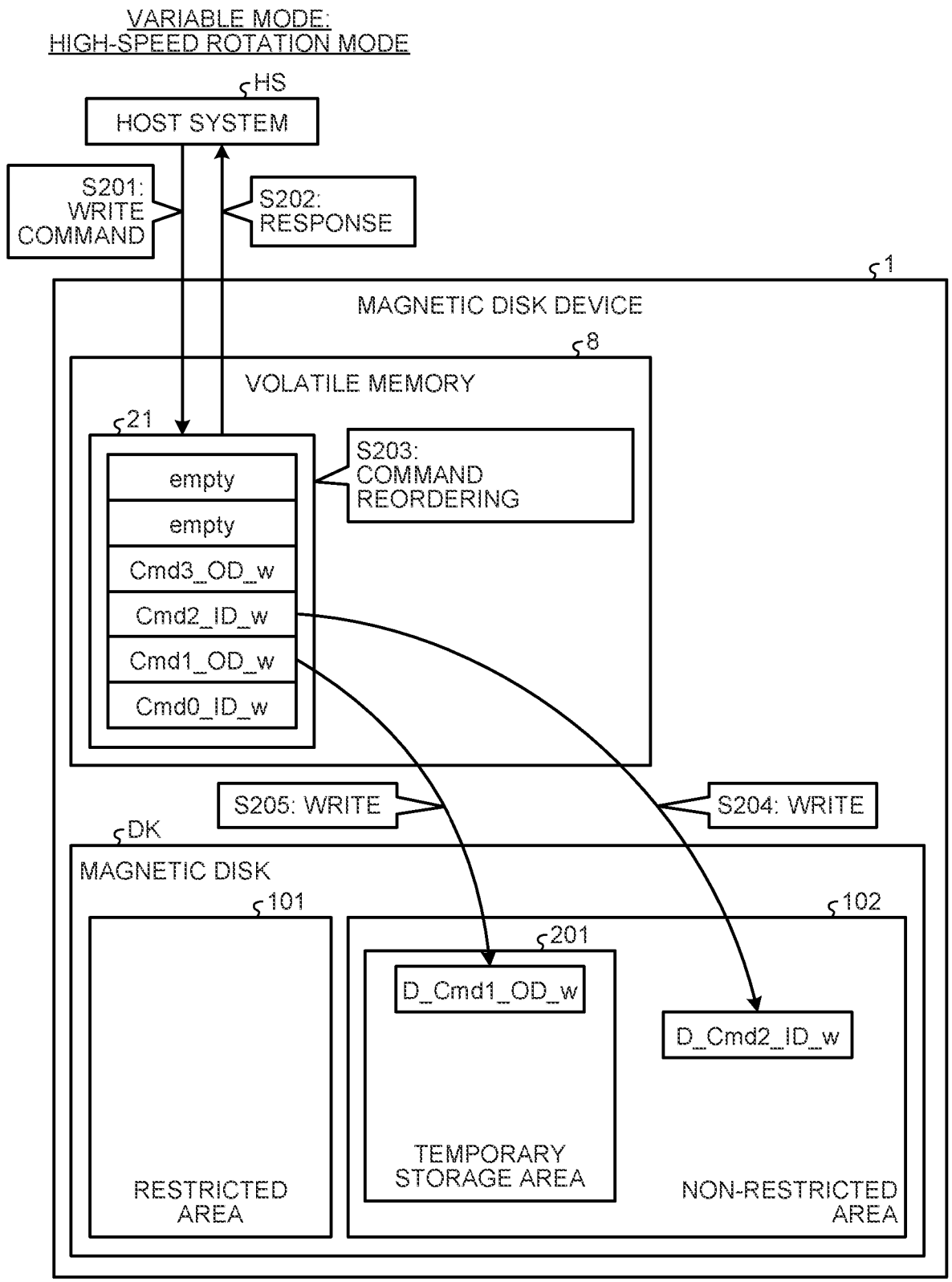
FIG. 7 is a schematic diagram illustrating an example of an operation in a variable mode and a high-speed rotation mode of the magnetic disk device according to the first embodiment.

FIG. 7 is a schematic diagram illustrating an example of operation in the variable mode and the high-speed rotation mode of the magnetic disk device 1 according to the first embodiment.

In the magnetic disk device 1, the HDC 13 executes storage of the received write command into the command queue 21 (S201) and a response indicating completion of the writing (S202) similarly to the processing of S101 to S102.

Four write commands, that is, a command Cmd0_ID_w, a command Cmd1_OD_w, a command Cmd2_ID_w, and a command Cmd3_OD_w are stored in the command queue 21. Note that "OD" included in the command names means that a position indicated by a logical address included in a write command is an area on the outer diameter side, that is, in the restricted area 101. "ID" included in the command names means that a position indicated by a logical address included in a write command is an area on the inner diameter side, that is, in the non-restricted area 102.

The HDC 13 sequentially selects commands to be processed from the command Cmd0_ID_w, the command Cmd1_OD_w, the command Cmd2_ID_w, and the command Cmd3_OD_w by executing the command reordering (S203). The SoC 5 sequentially executes the selected commands.

In the high-speed rotation mode, in a case where a position indicated by a logical address included in a write command is the restricted area 101, data that corresponds to the write command and that is to be written is written in the temporary storage area 201. In the command reordering in S203, the HDC 13 executes the command reordering on the basis of the position of the write destination in the temporary storage area 201 with respect to the data to be written in the temporary storage area 201.

Here, as an example, first, the command Cmd2_ID_w is selected, and writing of data to be written D_Cmd2_ID_w, which data corresponds to the command Cmd2_ID_w, to the non-restricted area 102 is executed (S204). The write destination of the data D_Cmd2_ID_w in the non-restricted area 102 is a position indicated by a logical address included in the command Cmd2_ID_w.

The command Cmd1_OD_w is selected following the command Cmd2_ID_w, and writing of data to be written D_Cmd1_OD_w, which data corresponds to the command Cmd1_OD_w, to the magnetic disk DK is executed (S205). Since a position indicated by a logical address included in the command Cmd1_OD_w is included in the restricted area 101, the SoC 5 writes the data D_Cmd1_OD_w not to the position indicated by the logical address included in the command Cmd1_OD_w but to the temporary storage area 201 provided in the non-restricted area 102.

As described above, by the restoration operation, the data stored in the temporary storage area 201 is moved to the final write destination in the restricted area 101, that is, the position designated as the write destination by the logical address included in the write command. The restoration operation is executed when the magnetic disk device 1 is in the normal rotation mode.

Figure 8:
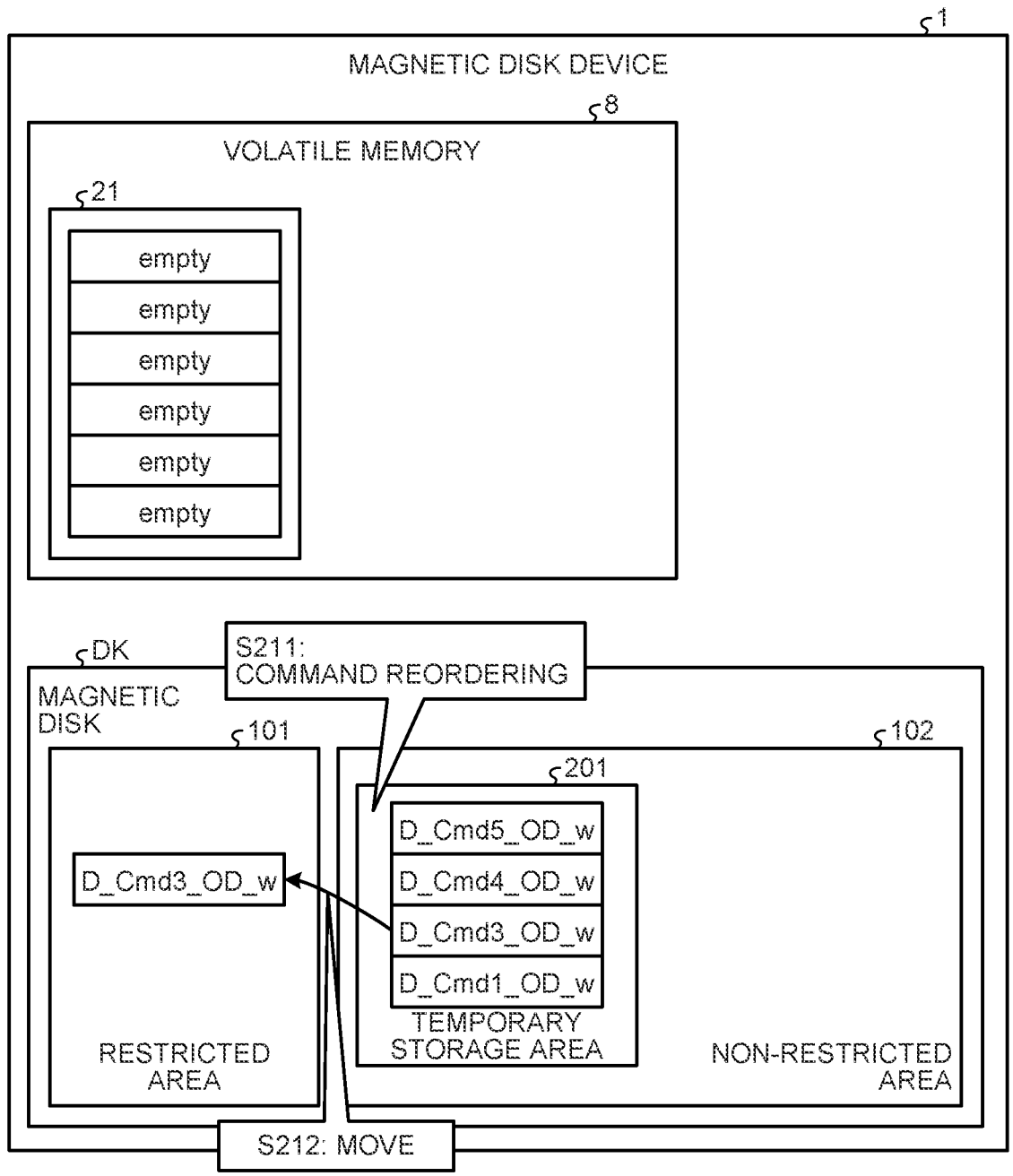
FIG. 8 is a schematic diagram illustrating an example of restoration operation in operation in the variable mode and a normal rotation mode of the magnetic disk device according to the first embodiment.

FIG. 8 is a schematic diagram illustrating an example of the restoration operation in operation in the variable mode and the normal rotation mode of the magnetic disk device 1 according to the first embodiment.

The restoration operation is executed, for example, in a case where there is no unprocessed command. In the example illustrated in FIG. 8, there is no unprocessed command in the command queue 21, and four pieces of data, that is, the data D_Cmd1_OD_w, the data D_Cmd3_OD_w, the data D_Cmd4_OD_w, and the data D_Cmd5_OD_w are stored in the temporary storage area 201. Thus, the restoration operation is started.

The HDC 13 sequentially selects one piece of data from the data D_Cmd1_OD_w, the data D_Cmd3_OD_w, the data D_Cmd4_OD_w, and the data D_Cmd5_OD_w by executing the command reordering (S211) also in the restoration operation. In S211, the HDC 13 executes the command reordering on the basis of a position of a movement source (that is, the position in the temporary storage area 201) and a position in a movement destination (that is, the final write position). The SoC 5 sequentially moves the selected data to the final write position in the restricted area 101. Processing in which the data D_Cmd3_OD_w is first selected and moved to the restricted area 101 (S212) is illustrated in FIG. 8 as an example. Subsequently, the other three pieces of data are sequentially selected and moved to the restricted area 101.

Note that the HDC 13 records, with respect to each piece of data written in the temporary storage area 201, a correspondence relationship between the position in the temporary storage area 201 and the final write destination into a management table. In the restoration operation, the HDC 13 specifies the final write destination of the data in the temporary storage area 201 on the basis of the management table.

Figure 9:
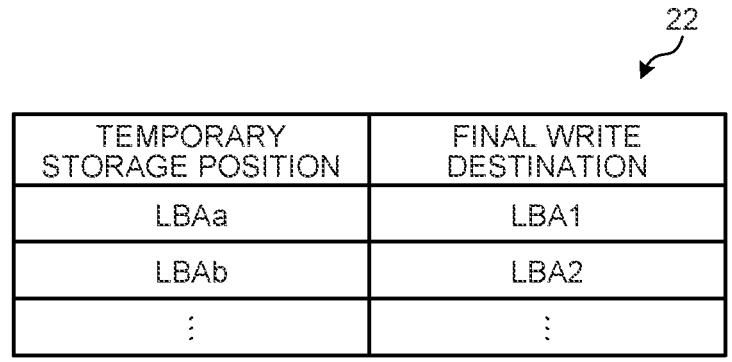
FIG. 9 is a schematic diagram illustrating an example of a data configuration of a management table according to the first embodiment.

FIG. 9 is a schematic diagram illustrating an example of a data configuration of the management table according to the first embodiment. In a management table 22, a correspondence relationship between a logical address indicating a position in the temporary storage area 201 (referred to as a temporary storage position) and a final write destination in the restricted area 101, that is, a logical address included in the write command is recorded. In the example illustrated in the present drawing, a final write destination "LBA1" is associated with a temporary storage position "LBAa", and a final write destination "LBA2" is associated with a temporary storage position "LBAb".

The management table 22 is stored in, for example, the volatile memory 8, the buffer memory 9, the non-volatile memory 10, or any other position. The HDC 13 adds the correspondence relationship to the management table 22 when writing data to the temporary storage area 201, and deletes the correspondence relationship from the management table 22 when the restoration operation is completed.

Execution of transition between the high-speed rotation mode and the normal rotation mode is determined on the basis of free capacity in the temporary storage area 201. Here, as an example, the execution of the transition between the high-speed rotation mode and the normal rotation mode is determined on the basis of a comparison between the free capacity of the temporary storage area 201 and two thresholds. The free capacity of the temporary storage area 201 is capacity that can be used for temporary storage of new data.

Figure 10:
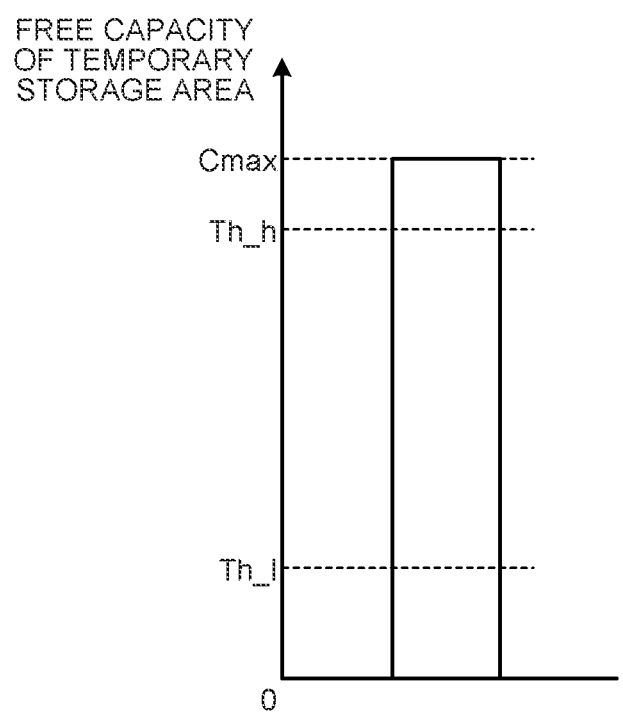
FIG. 10 is a schematic diagram illustrating an example of two thresholds used for execution of transition between the high-speed rotation mode and the normal rotation mode according to the first embodiment.

FIG. 10 is a schematic diagram illustrating an example of the two thresholds used for execution of the transition between the high-speed rotation mode and the normal rotation mode according to the first embodiment. In the present drawing, the capacity of the temporary storage area 201 is referred to as Cmax.

As thresholds to be compared with the free capacity of the temporary storage area 201, two thresholds Th_h and Th_l are set. Th_h is a value that is smaller than Cmax but is as large as possible. Th_l is a value that is slightly larger than 0 but is sufficiently smaller than Cmax and Th_h.

When the free capacity of the temporary storage area 201 falls below Th_l when the magnetic disk device 1 is in the high-speed rotation mode, the HDC 13 transitions the operation mode of the magnetic disk device 1 from the high-speed rotation mode to the normal rotation mode in order to start the restoration operation.

When the free capacity of the temporary storage area 201 exceeds Th_h while the magnetic disk device 1 is in the normal rotation mode, the HDC 13 transitions the operation mode of the magnetic disk device 1 from the normal rotation mode to the high-speed rotation mode.

Next, details of the operation of the magnetic disk device 1 according to the first embodiment will be described.

Figure 11:
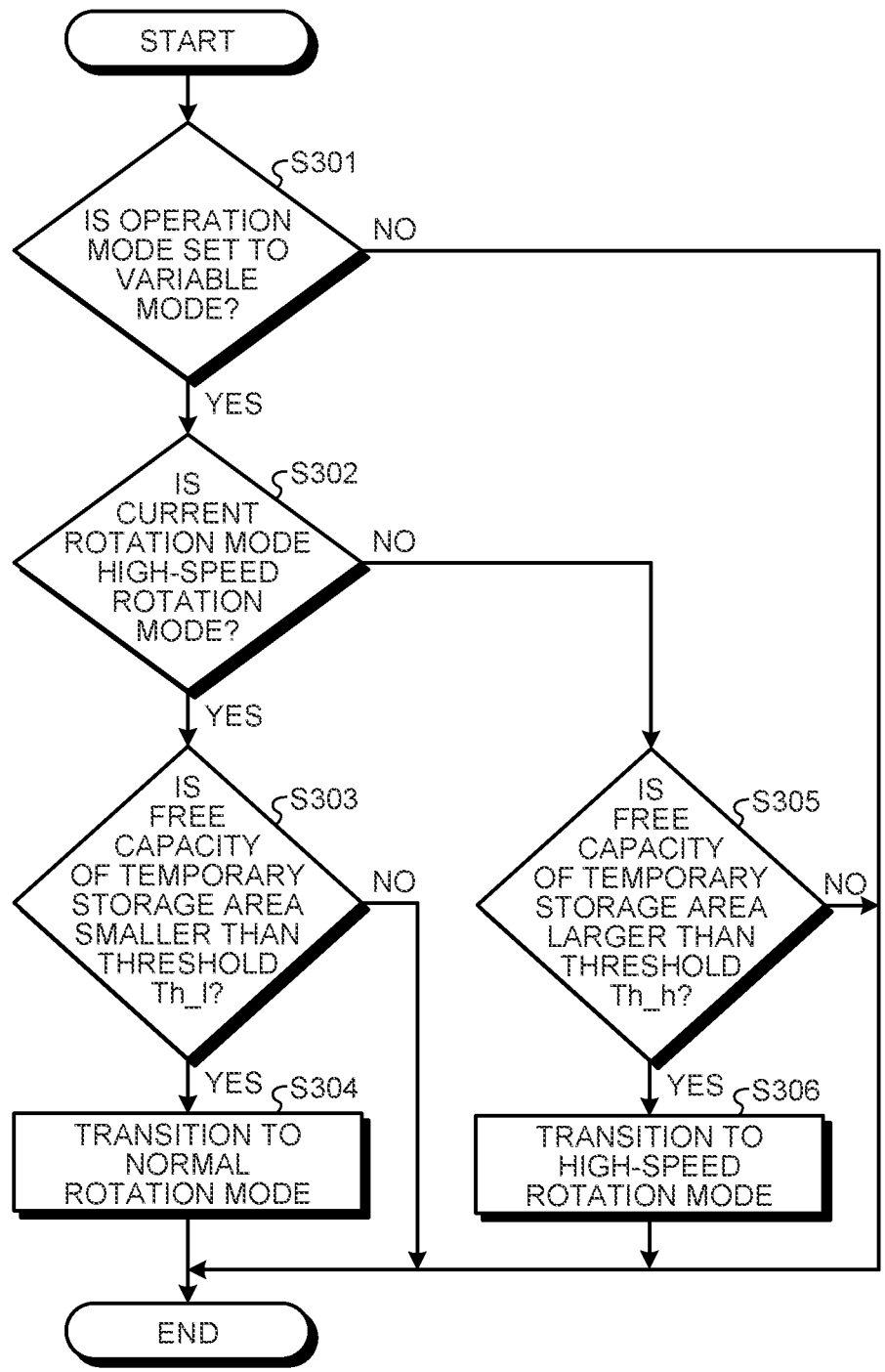
FIG. 11 is a flowchart illustrating an example of mode switching operation by the magnetic disk device according to the first embodiment.

FIG. 11 is a flowchart illustrating an example of mode switching operation by the magnetic disk device 1 according to the first embodiment.

First, the HDC 13 determines whether the operation mode is set to the variable mode (S301). The operation mode is determined by the designer at the time of manufacturing, and the setting of the operation mode is stored in a predetermined position. Alternatively, the operation mode is set by the host system HS, and the setting of the operation mode is stored in a predetermined position. The HDC 13 determines whether the operation mode is set to the variable mode by referring to the setting of the operation mode.

In a case where the operation mode is not set to the variable mode (S301: No), that is, in a case where the operation mode is set to the fixed mode, the mode switching operation ends.

In a case where the operation mode is set to the variable mode (S301: Yes), the HDC 13 determines whether the current rotation mode is the high-speed rotation mode (S302). In a case where the current rotation mode is the high-speed rotation mode (S302: Yes), the HDC 13 determines whether the free capacity of the temporary storage area 201 is smaller than the threshold Th_l (S303).

In a case where the free capacity of the temporary storage area 201 is smaller than the threshold Th_l (S303: Yes), the HDC 13 causes the rotation mode to transition from the high-speed rotation mode to the normal rotation mode (S304), and the mode switching operation ends. In a case where the free capacity of the temporary storage area 201 is not smaller than the threshold Th_l (S303: No), the mode switching operation ends.

In a case where the current rotation mode is not the high-speed rotation mode (S302: No), that is, in a case where the current rotation mode is the normal rotation mode, the HDC 13 determines whether the free capacity of the temporary storage area 201 is larger than the threshold Th_h (S305).

In a case where the free capacity of the temporary storage area 201 is larger than the threshold Th_h (S305: Yes), the HDC 13 causes the rotation mode to transition from the normal rotation mode to the high-speed rotation mode (S306), and the mode switching operation ends. In a case where the free capacity of the temporary storage area 201 is not larger than the threshold Th_h (S305: No), the mode switching operation ends.

The series of operations illustrated in FIG. 11 is executed a plurality of times at different timings. For example, the series of operations is performed in a background at predetermined time intervals.

Note that in a case where a period in which the series of operations cannot be started continues, such as a case where processing of a plurality of access commands is continuously executed in the high-speed rotation mode, the HDC 13 may forcibly transition to the normal rotation mode as the free space disappears in the temporary storage area 201.

In the above example, in a case where the free space of the temporary storage area 201 is equal to the threshold Th_l in the determination processing of S303, the high-speed rotation mode is maintained. The processing of a case where the free space of the temporary storage area 201 is equal to the threshold Th_l is not limited to the above. In a case where the free space of the temporary storage area 201 is equal to the threshold Th_l, the processing of S304 may be executed.

In the above example, in a case where the free space of the temporary storage area 201 is equal to the threshold Th_h in the determination processing of S305, the normal rotation mode is maintained. The processing of a case where the free space of the temporary storage area 201 is equal to the threshold Th_h is not limited to the above. In a case where the free space of the temporary storage area 201 is equal to the threshold Th_h, the processing of S306 may be executed.

Figure 12:
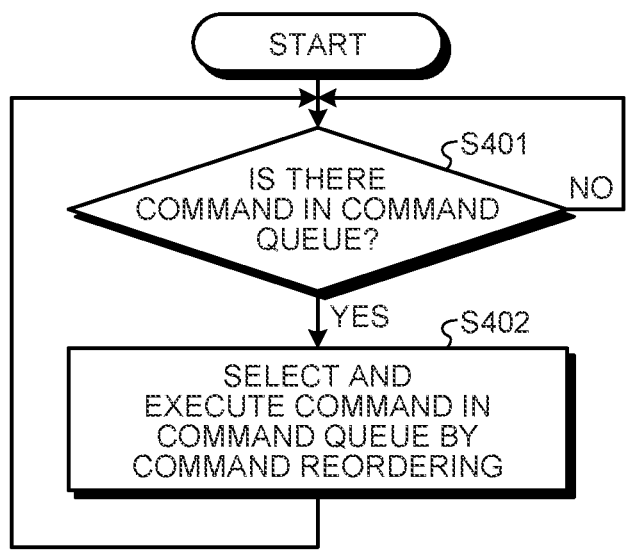
FIG. 12 is a flowchart illustrating an example of command processing operation in a fixed mode by the magnetic disk device according to the first embodiment.

FIG. 12 is a flowchart illustrating an example of command processing operation in the fixed mode by the magnetic disk device 1 according to the first embodiment.

The HDC 13 determines whether there are one or more commands in the command queue 21 (S401). In a case where there are one or more commands in the command queue 21 (S401: Yes), the HDC 13 selects a command from the command queue 21 by the command reordering and processes the selected command (S402). Then, the HDC 13 executes the processing of S401 again. In a case where there is no command in the command queue 21 (S401: No), the HDC 13 executes the processing of S401 again.

Figure 13:
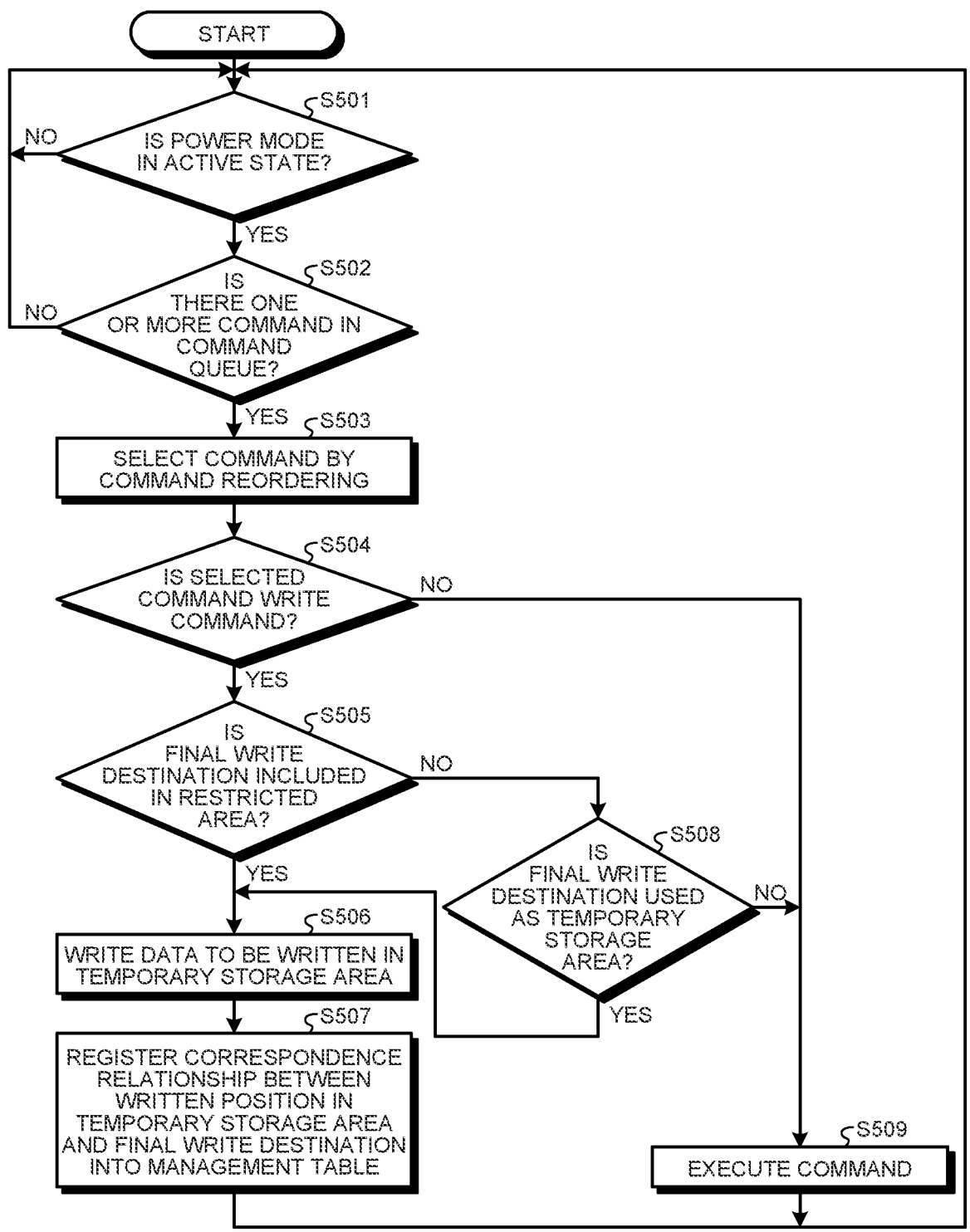
FIG. 13 is a flowchart illustrating an example of command processing operation in the variable mode and the high-speed rotation mode by the magnetic disk device according to the first embodiment.

FIG. 13 is a flowchart illustrating an example of command processing operation in the variable mode and the high-speed rotation mode by the magnetic disk device 1 according to the first embodiment. Note that the description will be made in the present drawing and in FIG. 14 on the assumption that the temporary storage area 201 is an area temporarily allocated to an area, which can be designated as a write destination of data by the host system HS, in the non-restricted area 102.

The HDC 13 first determines whether the current power mode is in an active state (S501). In a case where the current power mode is in the active state (S501: Yes), the HDC 13 determines whether there are one or more commands in the command queue 21 (S502).

In a case where the current power mode is not in the active state (S501: No) or in a case where one or more commands are not present in the command queue 21 (S502: No), the HDC 13 executes the processing of S501 again.

In a case where there are one or more commands in the command queue 21 (S502: Yes), the HDC 13 selects a command from the command queue 21 by the command reordering (S503) and determines whether the selected command is a write command (S504).

In a case where the selected command is the write command (S504: Yes), the HDC 13 determines whether a final write destination, that is, a position indicated by a logical address included in the write command is included in the restricted area 101 (S505).

In a case where the final write destination is included in the restricted area 101 (S505: Yes), the SoC 5 writes data, which corresponds to the write command and is to be written, into the temporary storage area 201 (S506). The HDC 13 registers a correspondence relationship between the position where the data is written in the temporary storage area 201 and the final write destination into the management table 22 (S507). Then, the HDC 13 executes the processing of S501 again.

In a case where the final write destination is not included in the restricted area 101 (S505: No), that is, in a case where the final write destination is included in the non-restricted area 102, the HDC 13 determines whether the final write destination is used as the temporary storage area 201 (S508). That is, the HDC 13 determines whether another piece of data (specifically, another piece of data scheduled to be moved to the restricted area 101 by the restoration operation) is stored in the final write destination.

In a case where the final write destination is used as the temporary storage area 201 (S508: Yes), the SoC 5 executes the processing of S506. In a case where the final write destination is not used as the temporary storage area 201 (S508: No), the SoC 5 performs processing of the selected write command (S509). That is, the SoC 5 writes data to be written into the non-restricted area 102 according to the write command. After S509, the HDC 13 executes the processing of S501 again.

In a case where the selected command is not the write command (S504: No), that is, for example, in a case where the selected command is a read command, the SoC 5 performs processing of the selected read command (S509). That is, the SoC 5 reads data to be read from the magnetic disk DK according to the read command, and transfers the read data to the host system HS.

Figure 14:
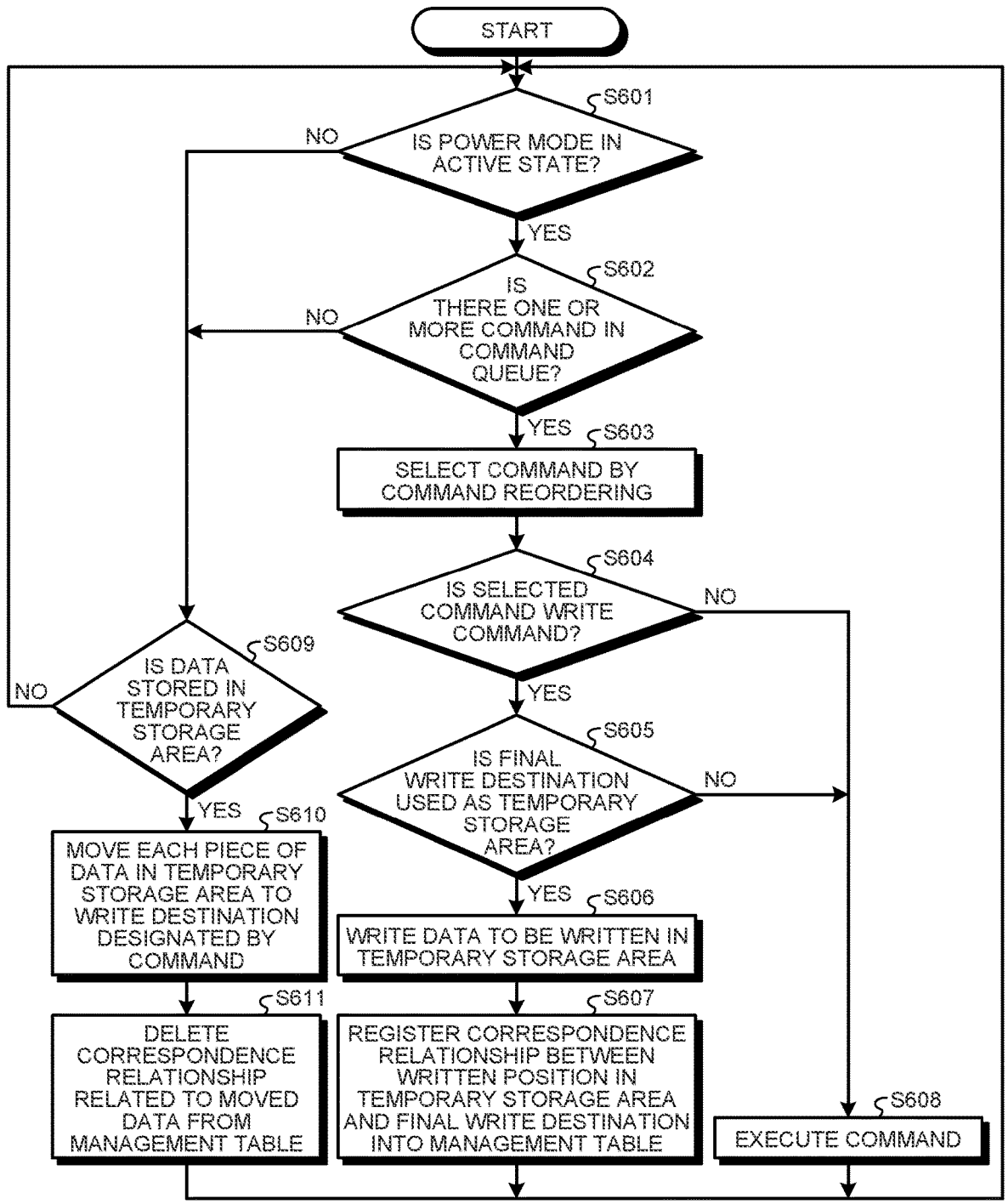
FIG. 14 is a flowchart illustrating an example of command processing operation in the variable mode and the normal rotation mode by the magnetic disk device according to the first embodiment.

FIG. 14 is a flowchart illustrating an example of command processing operation in the variable mode and the normal rotation mode by the magnetic disk device 1 according to the first embodiment.

The HDC 13 first determines whether the current power mode is in an active state (S601). In a case where the current power mode is in the active state (S601: Yes), the HDC 13 determines whether there are one or more commands in the command queue 21 (S602).

In a case where there are one or more commands in the command queue 21 (S602: Yes), the HDC 13 selects a command from the command queue 21 by the command reordering (S603) and determines whether the selected command is a write command (S604).

In a case where the selected command is the write command (S604: Yes), the HDC 13 determines whether a final write destination, that is, a position indicated by a logical address included in the write command is used as the temporary storage area 201 (S605). That is, the HDC 13 determines whether another piece of data (specifically, another piece of data scheduled to be moved to the restricted area 101 by the restoration operation) is stored in the final write destination.

In a case where the final write destination is used as the temporary storage area 201 (S605: Yes), the SoC 5 writes data, which corresponds to the write command and is to be written, into the temporary storage area 201 (S606). The HDC 13 registers a correspondence relationship between the position where the data is written in the temporary storage area 201 and the final write destination into the management table 22 (S607). Then, the HDC 13 executes the processing of S601 again.

In a case where the selected command is not a write command (S604: No) or in a case where the final write destination is not used as the temporary storage area 201 (S605: No), the SoC 5 executes processing of the selected command (S608). Then, the HDC 13 executes the processing of S601 again.

In a case where the current power mode is not in the active state (S601: No), that is, in a case where the current power mode is an idle state (such as the first idle state), or in a case where one or more commands are not present in the command queue 21 (S602: No), the HDC 13 determines whether data is stored in the temporary storage area 201 (S609).

In a case where no data is stored in the temporary storage area 201 (S609: No), the HDC 13 executes the processing of S601 again.

In a case where data is stored in the temporary storage area 201 (S609: Yes), the SoC 5 moves each piece of the data in the temporary storage area 201 to the final write destination (S610). The HDC 13 deletes the correspondence relationship related to the moved data from the management table 22 (S611). Then, the HDC 13 executes the processing of S601 again.

As described above, according to the first embodiment, the restricted area 101, and the non-restricted area 102 located on the inner diameter side of the restricted area 101 are provided in the magnetic disk DK. In a case where the write position of the data which position is instructed by the write command is included in the restricted area 101, the SoC 5 writes the data in the restricted area 101 in the normal rotation mode. In a case where the write position of the data which position is instructed by the write command is included in the non-restricted area 102, the SoC 5 writes the data in the non-restricted area 102 in the high-speed rotation mode.

Thus, it is possible to achieve both improvement in reading and writing performance and control of a decrease in the storage capacity of the magnetic disk.

Furthermore, according to the first embodiment, the SoC 5 receives a write command in the high-speed rotation mode, and writes data in the temporary storage area 201 in a case where a position designated as a write destination of the data by the write command is included in the restricted area 101. Subsequently, in a case where a predetermined condition is satisfied, the SoC 5 transfers the data in the temporary storage area 201 to the final write destination in the restricted area 101 in the normal rotation mode.

Since the switching of the rotation mode involves a change in the rotational speed of the SPM 2, the switching of the rotation mode requires time associated with the change in the rotational speed. Even in a case where the write command in which the restricted area 101 is designated as the write destination is received in the high-speed rotation mode, the rotation mode can be maintained in the high-speed rotation mode until a predetermined condition is satisfied. Thus, a frequency of changing the rotational speed can be reduced, and a temporal cost associated with the change in the rotational speed can be controlled.

Furthermore, the temporary storage area 201 is provided in the non-restricted area 102 according to the first embodiment.

Thus, even in a case where a write command in which the restricted area 101 is designated as a write destination is received in the high-speed rotation mode, the write command can be processed in a state in which the rotation mode is maintained in the high-speed rotation mode until the predetermined condition is satisfied.

Furthermore, according to the first embodiment, the SoC 5 transitions to the high-speed rotation mode in a case where the free capacity of the temporary storage area 201 exceeds the threshold Th_h, and transitions to the normal rotation mode in a case where the free capacity of the temporary storage area 201 falls below the threshold Th_l.

Thus, it is possible to realize the operation in the high-speed rotation mode without depleting the free space of the temporary storage area 201.

Furthermore, according to the first embodiment, the SoC 5 starts the restoration operation in a case where there is no unprocessed command in the normal rotation mode. Alternatively, according to the first embodiment, the SoC 5 starts the restoration operation when the power mode is the idle state (such as the first idle state) in the normal rotation mode.

Thus, execution of the restoration operation is concealed from the host system HS. That is, the writing and reading performance as viewed from the host system HS is improved.

Second Embodiment

In the first embodiment, the temporary storage area (that is, the temporary storage area 201) is provided in the non-restricted area 102. The place where the temporary storage area is provided is not limited to the inside of the non-restricted area 102.

In the second embodiment, an example in which a temporary storage area is provided in a non-volatile memory 10 will be described. A magnetic disk device according to the second embodiment is referred to as a magnetic disk device 1a. Note that in the second embodiment, configurations similar to those of the first embodiment will be briefly described or description thereof will be omitted.

Figure 15:
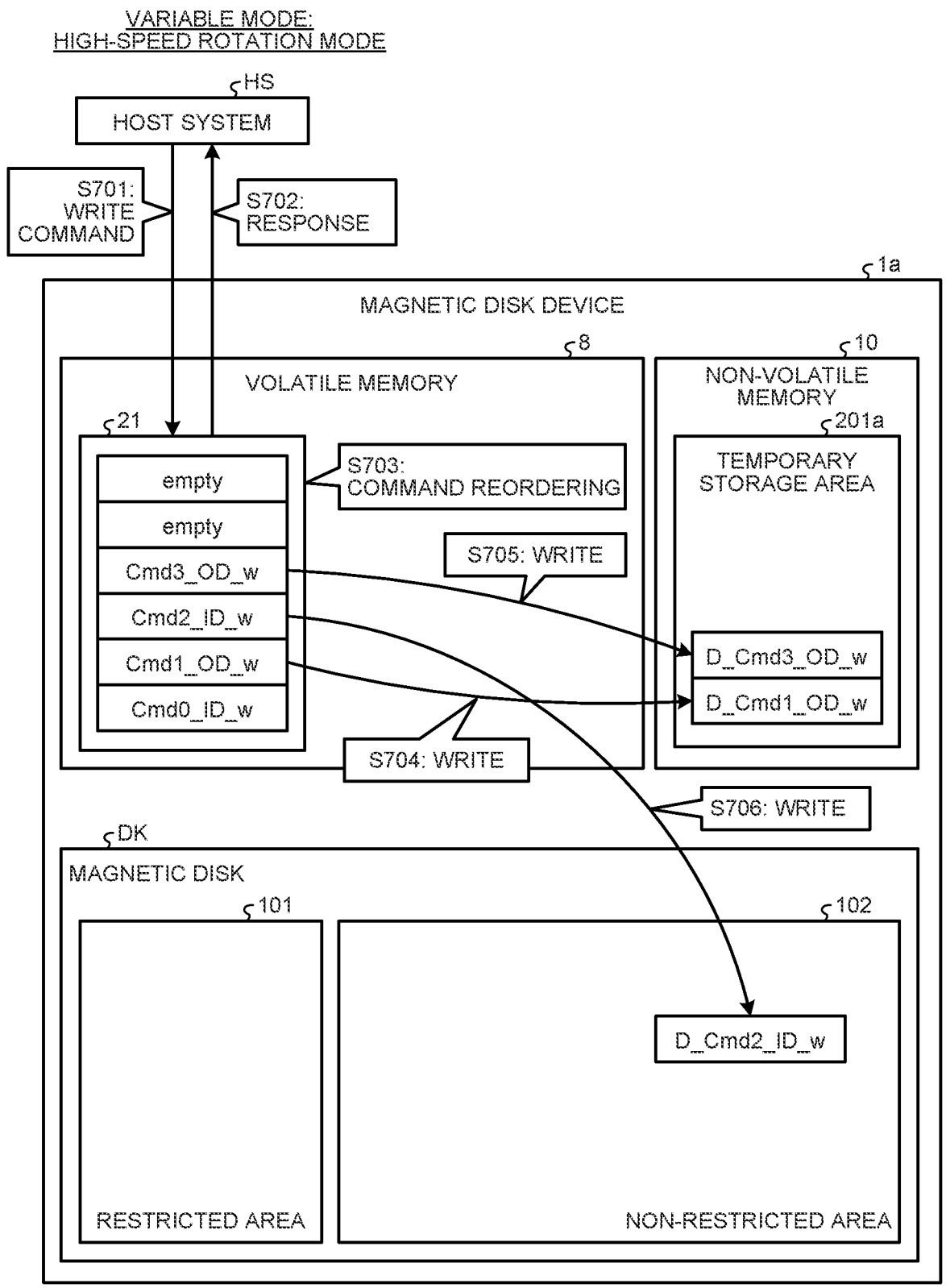
FIG. 15 is a schematic diagram illustrating an example of operation in a variable mode and a high-speed rotation mode of a magnetic disk device according to a second embodiment.

FIG. 15 is a schematic diagram illustrating an example of operation in a variable mode and a high-speed rotation mode of the magnetic disk device 1a according to the second embodiment. As illustrated in the present drawing, according to the second embodiment, a temporary storage area 201a is provided in a non-volatile memory 10 included in the magnetic disk device 1a, and no temporary storage area is provided in a non-restricted area 102.

In the magnetic disk device 1a, an HDC 13 executes storage of a received write command into a command queue 21 (S701) and a response indicating completion of the writing (S702) similarly to the processing of S101 to S102.

Four write commands, that is, a command Cmd0_ID_w, a command Cmd1_OD_w, a command Cmd2_ID_w, and a command Cmd3_OD_w are stored in the command queue 21. The HDC 13 sequentially selects commands to be processed from the command Cmd0_ID_w, the command Cmd1_OD_w, the command Cmd2_ID_w, and the command Cmd3_OD_w by executing command reordering (S703).

Note that a final write destination for each of the command Cmd1_OD_w and the command Cmd3_OD_w is included in a restricted area 101. Thus, pieces of data to be written which pieces of data correspond to these commands are written into the temporary storage area 201a in the high-speed rotation mode. In S703, the HDC 13 executes the command reordering for the command Cmd1_OD_w and the command Cmd3_OD_w on the basis of write destinations in the temporary storage area 201a.

Writing to the non-volatile memory 10 can be processed at a higher speed than that to a magnetic disk DK. Thus, as an example here, first, the command Cmd1_OD_w is selected and writing of data D_Cmd1_OD_w, which corresponds to the command Cmd1_OD_w and is to be written, into the temporary storage area 201a is executed (S704). Then, the command Cmd3_OD_w is selected following the command Cmd1_OD_w and writing of data D_Cmd3_OD_w, which corresponds to the command Cmd3_OD_w and is to be written, into the temporary storage area 201a is executed (S705).

When the processing of all of the write commands in which the restricted area 101 is the temporary write destination, that is, the command Cmd1_OD_w and the command Cmd3_OD_w is completed, the command Cmd2_ID_w is selected and writing of data D_Cmd2_ID_w, which corresponds to the command Cmd2_ID_w and is to be written, into the non-restricted area 102 is executed (S706).

In such a manner, data a final write destination of which is the restricted area 101 is written in the temporary storage area 201a provided in the non-volatile memory 10 in a high-speed rotation mode.

Figure 16:
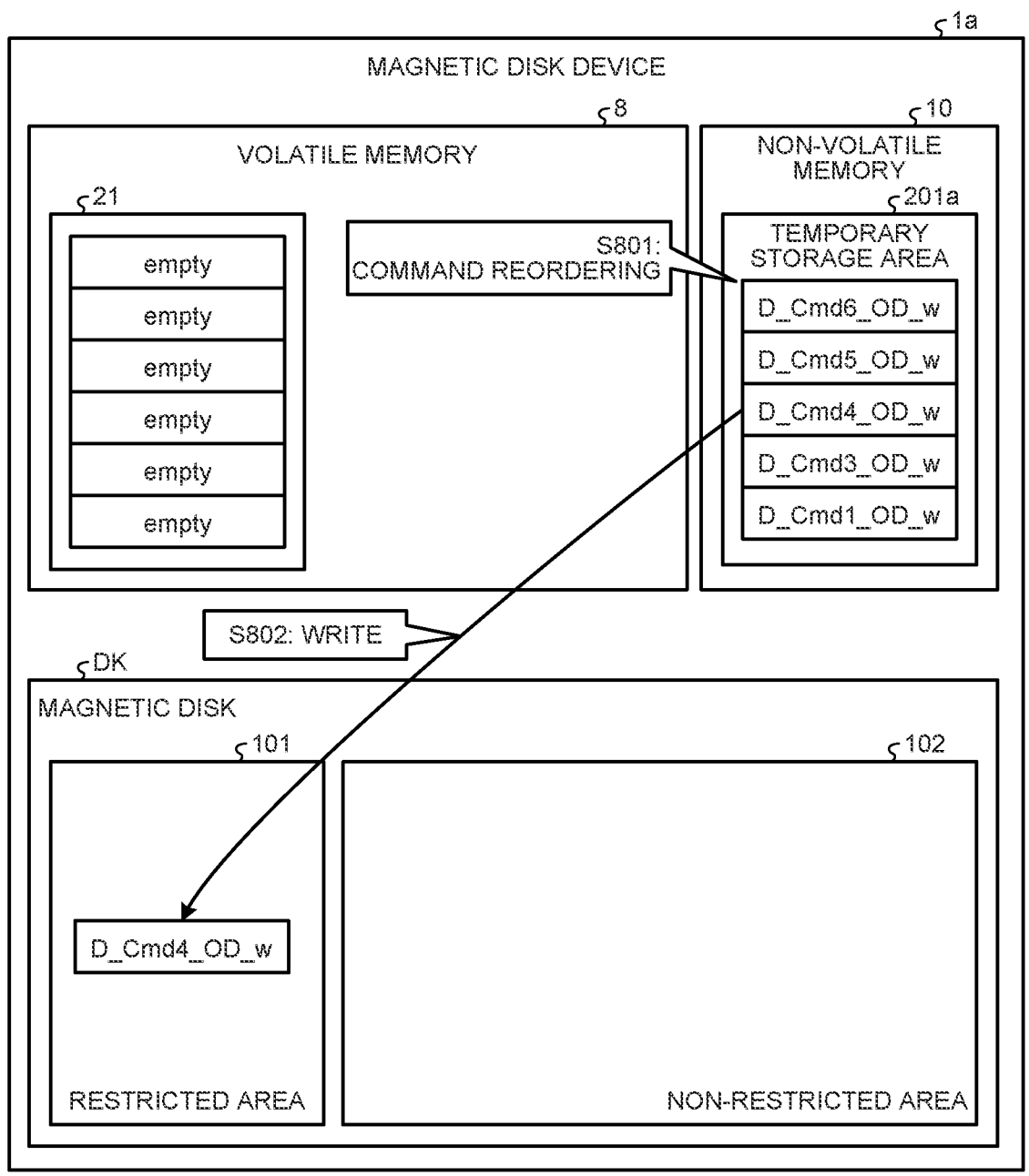
FIG. 16 is a schematic diagram illustrating an example of restoration operation in operation in the variable mode and a normal rotation mode of the magnetic disk device according to the second embodiment.

FIG. 16 is a schematic diagram illustrating an example of restoration operation in operation in the variable mode and a normal rotation mode of the magnetic disk device 1a according to the second embodiment.

In the example illustrated in FIG. 16, there is no unprocessed command in the command queue 21, and five pieces of data, that is, data D_Cmd1_OD_w, data D_Cmd3_OD_w, data D_Cmd4_OD_w, data D_Cmd5_OD_w, and data D_Cmd6_OD_w are stored in the temporary storage area 201a. A final write destination of each of these five pieces of data is included in the restricted area 101. Thus, these five pieces of data are targets of the restoration operation.

In the restoration operation, the HDC 13 sequentially selects one piece of data from the data D_Cmd1_OD_w, the data D_Cmd3_OD_w, the data D_Cmd4_OD_w, the data D_Cmd5_OD_w, and the data D_Cmd6_OD_w by executing the command reordering (S801). The SoC 5 sequentially moves the selected data to the final write position in the restricted area 101. Processing in which the data D_Cmd4_OD_w is first selected and moved to the restricted area 101 (S802) is illustrated as an example in FIG. 16. Subsequently, the other four pieces of data are sequentially selected and moved to the restricted area 101.

In such a manner, the magnetic disk device 1a may be configured in such a manner that the temporary storage area 201a is provided in the non-volatile memory 10, and data which is to be written and a final write destination of which is included in the restricted area 101 is written in the temporary storage area 201a in the high-speed rotation mode.

Third Embodiment

In the third embodiment, an example in which a temporary storage area is provided in both of a non-restricted area 102 and a non-volatile memory 10 will be described. A magnetic disk device according to the third embodiment is referred to as a magnetic disk device 1b. Note that in the third embodiment, configurations similar to those of the first embodiment will be briefly described or description thereof will be omitted.

Figure 17:
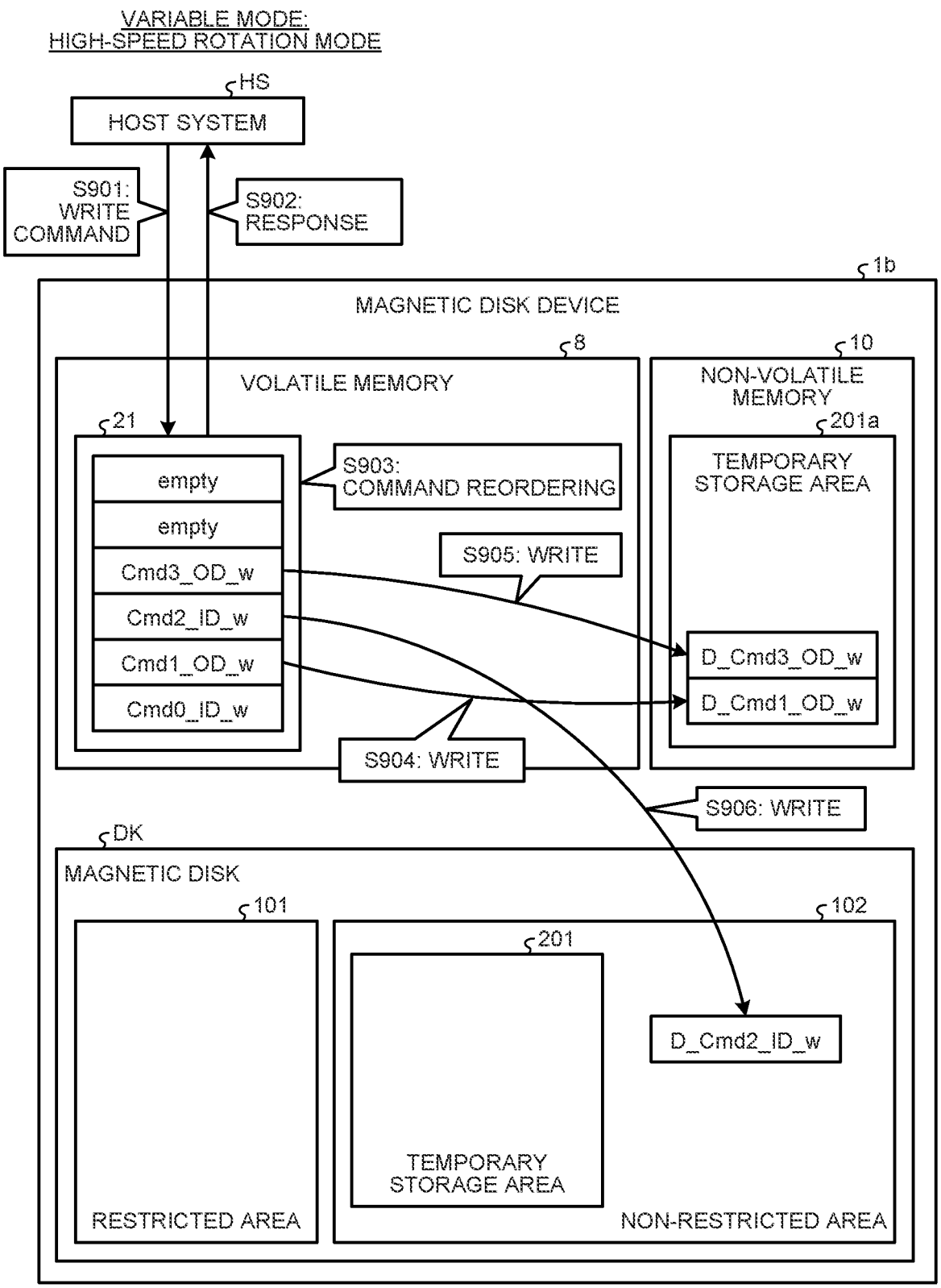
FIG. 17 is a schematic diagram illustrating an example of operation in a variable mode and a high-speed rotation mode of a magnetic disk device according to a third embodiment.

FIG. 17 is a schematic diagram illustrating an example of operation in a variable mode and a high-speed rotation mode of the magnetic disk device 1b according to the third embodiment. As illustrated in the present drawing, according to the third embodiment, a temporary storage area 201 is provided in the non-restricted area 102, and a temporary storage area 201a is provided in the non-volatile memory 10.

In the magnetic disk device 1b, the HDC 13 executes storage of a received write command into a command queue 21 (S901) and a response indicating completion of the writing (S902) similarly to the processing of S101 to S102.

Four write commands, that is, a command Cmd0_ID_w, a command Cmd1_OD_w, a command Cmd2_ID_w, and a command Cmd3_OD_w are stored in the command queue 21. The HDC 13 sequentially selects commands to be processed from the command Cmd0_ID_w, the command Cmd1_OD_w, the command Cmd2_ID_w, and the command Cmd3_OD_w by executing command reordering (S903). In S903, the HDC 13 executes command reordering for the command Cmd1_OD_w and the command Cmd3_OD_w on the basis of write destinations in the temporary storage area 201a.

As described above, writing to the non-volatile memory 10 can be processed at a higher speed than that to a magnetic disk DK. Thus, for example, first, the command Cmd1_OD_w is selected, and writing of data D_Cmd1_OD_w, which corresponds to the command Cmd1_OD_w and is to be written, into the temporary storage area 201a is executed (S904). Then, the command Cmd3_OD_w is selected following the command Cmd1_OD_w and writing of data D_Cmd3_OD_w, which corresponds to the command Cmd3_OD_w and is to be written, into the temporary storage area 201a is executed (S905).

When the processing of all of the write commands in which the restricted area 101 is the temporary write destination, that is, the command Cmd1_OD_w and the command Cmd3_OD_w is completed, the command Cmd2_ID_w is selected and writing of data D_Cmd2_ID_w, which corresponds to the command Cmd2_ID_w and is to be written, into the non-restricted area 102 is executed (S906).

In such a manner, the data which is to be written and in which the restricted area 101 is set as the temporary write destination is written in the temporary storage area 201a until a free space of the temporary storage area 201a disappears.

Figure 18:
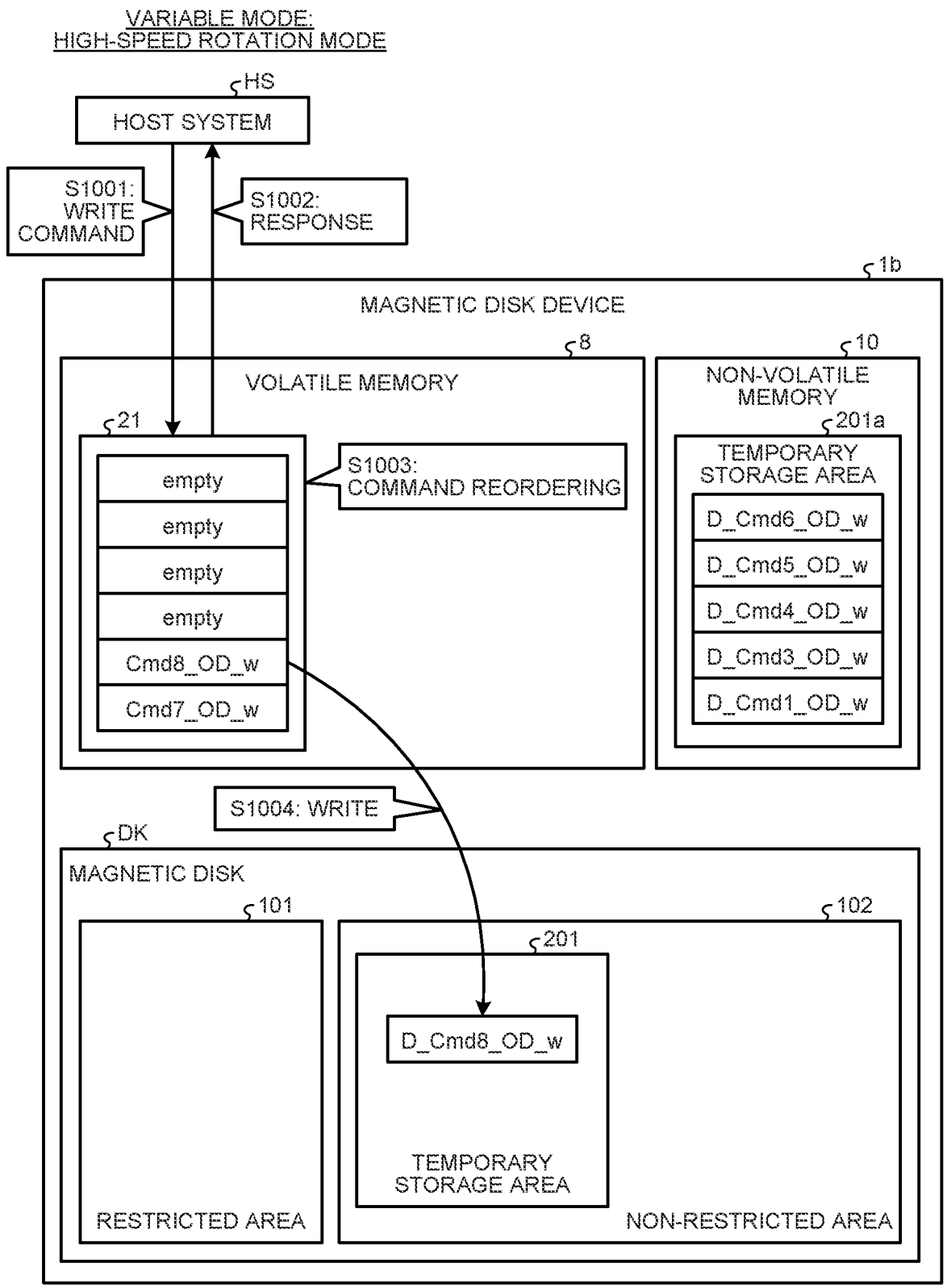
FIG. 18 is a schematic diagram illustrating an example of operation after a free space disappears from a temporary storage area in a non-volatile memory in the variable mode and the high-speed rotation mode of the magnetic disk device according to the third embodiment.

FIG. 18 is a schematic diagram illustrating an example of operation after the free space disappears from the temporary storage area 201a in the variable mode and the high-speed rotation mode of the magnetic disk device 1b according to the third embodiment.

In the magnetic disk device 1b, the HDC 13 executes storage of a received write command into the command queue 21 (S1001) and a response indicating completion of writing (S1002) similarly to the processing of S101 to S102.

In the temporary storage area 201a, data a final write destination of which is included in the restricted area 101 is stored to the full extent. Specifically, the data D_Cmd1_OD_w instructed to be written by the command Cmd1_OD_w, the data D_Cmd3_OD_w instructed to be written by the command Cmd3_OD_w, data D_Cmd4_OD_w instructed to be written by the command Cmd4_OD_w, data D_Cmd5_OD_w instructed to be written by a command Cmd5_OD_w, and data D_Cmd6_OD_w instructed to be written by a command Cmd6_OD_w are stored in the temporary storage area 201a, and there is no free space in the temporary storage area 201a.

Then, the command queue 21 stores two write commands, that is, a command Cmd7_ID_w and a command Cmd8_OD_w. The HDC 13 sequentially selects commands to be processed from the command Cmd7_ID_w and the command Cmd8_OD_w by executing the command reordering (S1003). In S1003, the HDC 13 executes the command reordering for the command Cmd7_OD_w and the command Cmd8_OD_w on the basis of write destinations in the temporary storage area 201.

Here, for example, first, the command Cmd8_OD_w is selected and writing of data D_Cmd8_OD_w, which corresponds to the command Cmd8_OD_w and is to be written, into the temporary storage area 201a is executed (S1004).

In such a manner, the SoC 5 writes data to the temporary storage area 201a in preference to the temporary storage area 201.

In the restoration operation, either the data stored in the temporary storage area 201a or the data stored in the temporary storage area 201 may be moved first.

Figure 19:
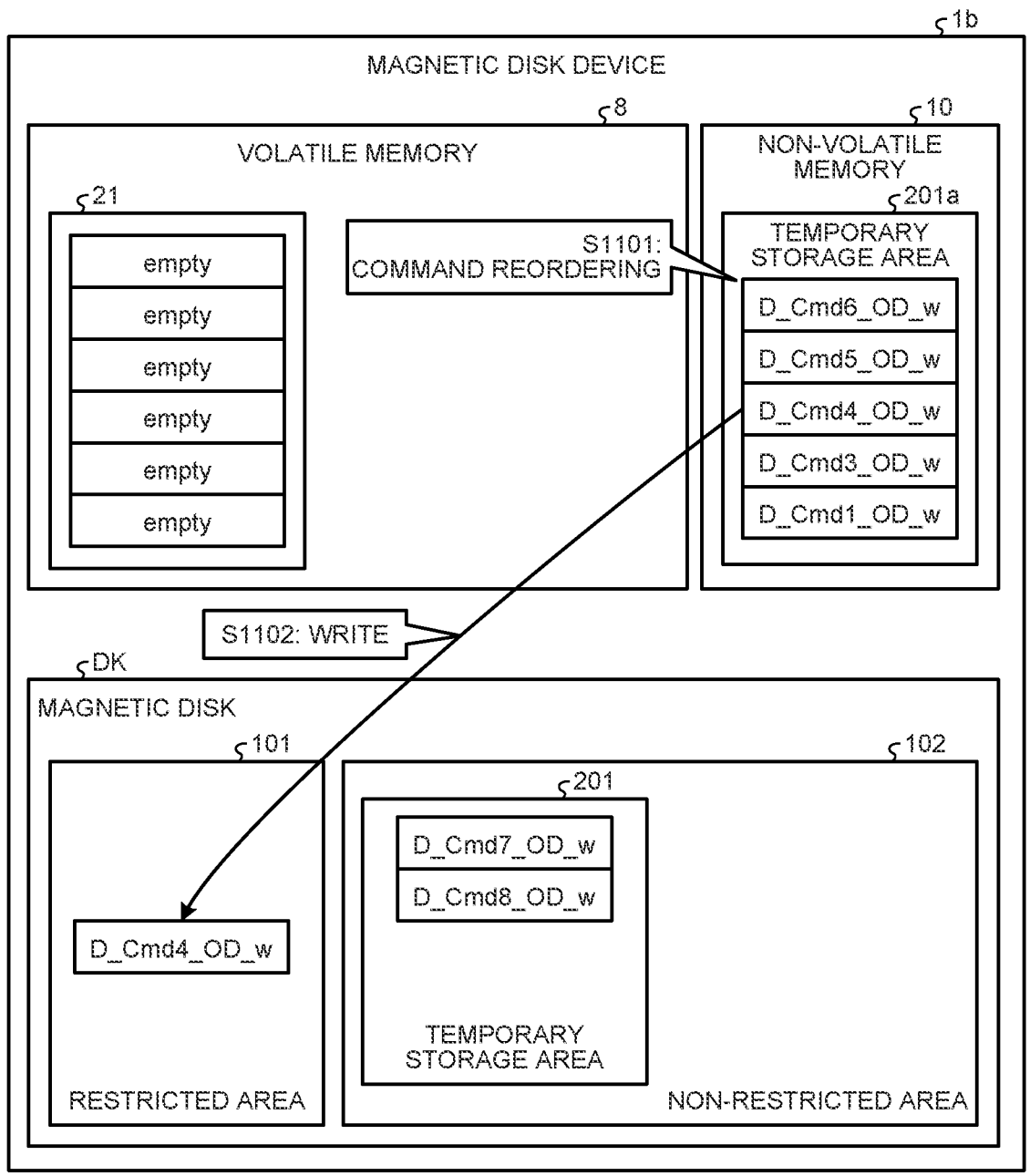
FIG. 19 is a schematic diagram illustrating an example of restoration operation in operation in the variable mode and a normal rotation mode of the magnetic disk device according to the third embodiment.

For example, as illustrated in FIG. 19, first, the HDC 13 selects data to be moved by command reordering from the five pieces of data stored in the temporary storage area 201a among the five pieces of data stored in the temporary storage area 201a (data D_Cmd1_OD_w, data D_Cmd3_OD_w, data D_Cmd4_OD_w, data D_Cmd5_OD_w, and data D_Cmd6_OD_w) and the two pieces of data stored in the temporary storage area 201 (data D_Cmd7_OD_w and data D_Cmd8_OD_w) (S1101). Here, as an example, first, the data D_Cmd4_OD_w is selected. The SoC 5 moves the selected data D_Cmd4_OD_w to a final write position in the restricted area 101 (S1102).

When the movement of the data D_Cmd4_OD_w is completed, movement of the other four pieces of data in the temporary storage area 201a is sequentially performed. When data that is not yet moved disappears from the temporary storage area 201a, restoration operation for the data stored in the temporary storage area 201 is started.

Figure 20:
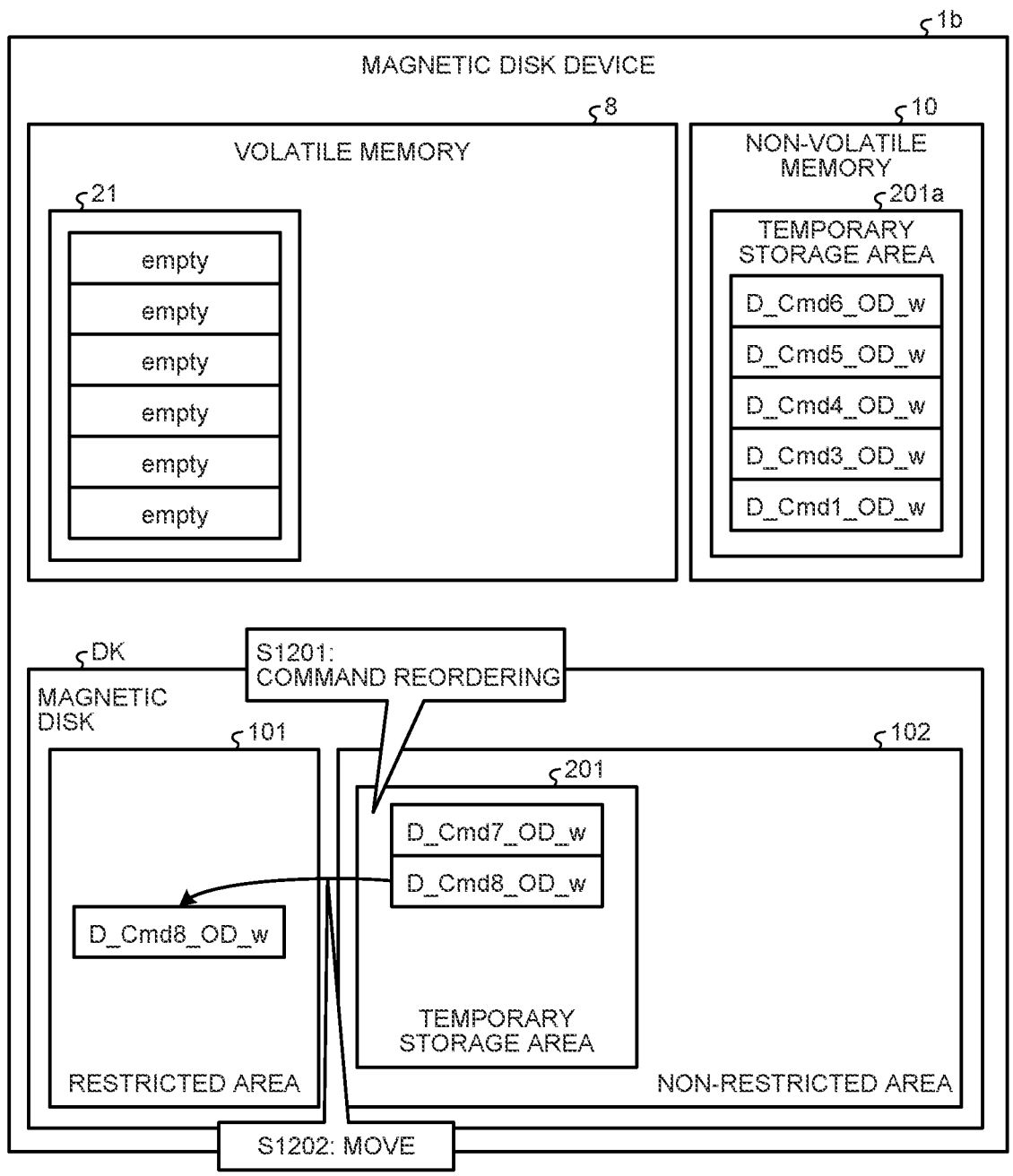
FIG. 20 is a schematic diagram illustrating another example of the restoration operation in the operation in the variable mode and the normal rotation mode of the magnetic disk device according to the third embodiment.

In another example, as illustrated in FIG. 20, first, the HDC 13 selects data to be moved by command reordering from the two pieces of data stored in the temporary storage area 201 among the five pieces of data stored in the temporary storage area 201a and the two pieces of data stored in the temporary storage area 201 (S1201). Here, as an example, first, the data D_Cmd8_OD_w is selected. The SoC 5 moves the selected data D_Cmd8_OD_w to a final write position in the restricted area 101 (S1202).

When the movement of the data D_Cmd8_OD_w is completed, movement of the data D_Cmd7_OD_w is performed. When data that is not yet moved disappears from the temporary storage area 201, restoration operation for the data stored in the temporary storage area 201a is started.

In such a manner, according to the third embodiment, the temporary storage area 201 is provided in the non-restricted area 102, and the temporary storage area 201a is provided in the non-volatile memory 10. Then, the SoC 5 writes data to the temporary storage area 201a in preference to the temporary storage area 201.

Fourth Embodiment

System data of the magnetic disk devices 1, 1a, and 1b includes system data that is determined at the time of manufacturing or before shipment and is not changed thereafter, and system data that is changed or generated after the shipment. The former system data may include an operating parameter. The latter system data may include a log or Self-Monitoring Analysis and Reporting Technology (SMART) information.

As described above, writing and reading can be performed in the non-restricted area 102 regardless of the rotation mode. Then, in the restricted area 101, reading and writing can be performed in the normal rotation mode although only reading can be performed in the high-speed rotation mode.

Figure 21:
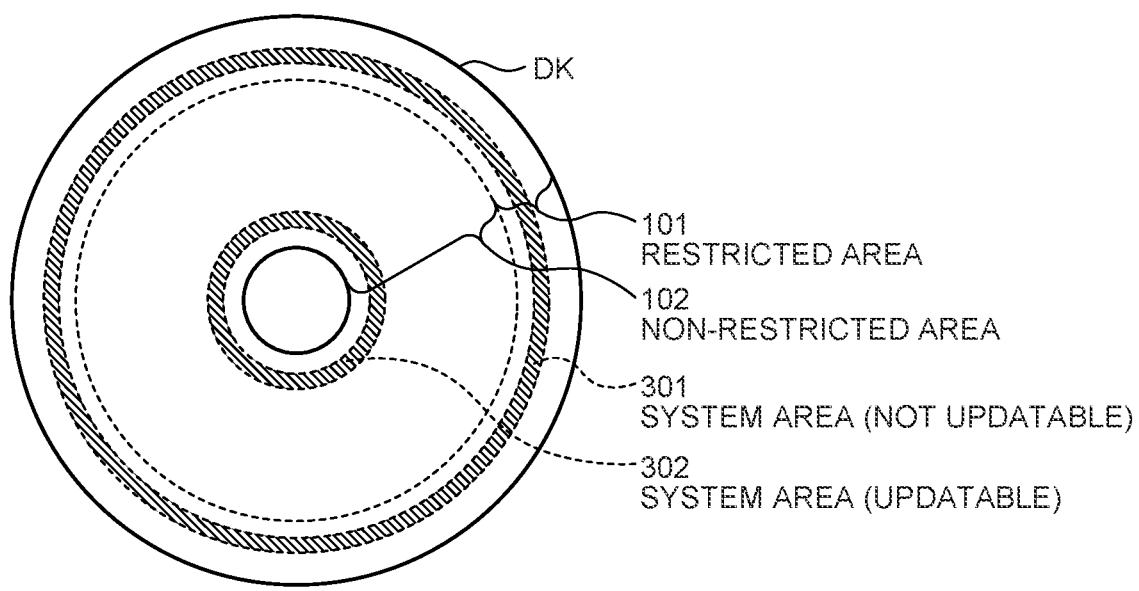
FIG. 21 is a view illustrating an example of a configuration of a magnetic disk according to the fourth embodiment.

Thus, as illustrated in FIG. 21, a system area 301, in which an update is set to be impossible, is allocated to a restricted area 101, and a system area 302 set to be updatable is allocated to a non-restricted area 102 in the fourth embodiment. The system area 301 stores system data that is determined at the time of manufacturing or before shipment and is not changed thereafter, and the system area 302 stores system data that is changed or generated after the shipment.

As a result, it becomes possible to record and refer to the system data without requiring restoration operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk, a first area and a second area located on an inner diameter side of the first area being provided therein;
a motor rotating the magnetic disk;
a magnetic head; and
a controller that
receives a write command from a host,
writes, in a case where a first position that is a position designated as a write destination of data by the write command is included in the first area, the data to the first position by the magnetic head while causing the magnetic disk to rotate at a rotational speed of a first value, and
writes, in a case where the first position is included in the second area, the data to the first position by the magnetic head while causing the magnetic disk to rotate at a rotational speed of a second value larger than the first value, wherein
an area, a recording frequency of the magnetic head exceeding a set level in the area, is set as the first area, and
the set level is determined on a basis of an error rate at a time of access.

2. A magnetic disk device comprising:
a magnetic disk, a first area and a second area located on an inner diameter side of the first area being provided therein;
a motor rotating the magnetic disk;
a magnetic head; and
a controller that
receives a write command from a host,
writes, in a case where a first position that is a position designated as a write destination of data by the write command is included in the first area, the data to the first position by the magnetic head while causing the magnetic disk to rotate at a rotational speed of a first value,
writes, in a case where the first position is included in the second area, the data to the first position by the magnetic head while causing the magnetic disk to rotate at a rotational speed of a second value larger than the first value,
writes the data in a third area different from the first area in a case where the write command is received when the magnetic disk is rotated at the rotational speed of the second value and the first position is included in the first area, and transfers the data from the third area to the first position in the first area while causing the magnetic disk to rotate at the rotational speed of the first value in a case where a setting condition is satisfied.

3. The magnetic disk device according to claim 2, wherein the third area is provided in the second area, and
the controller writes the data into the third area while causing the magnetic disk to rotate at the rotational speed of the second value in a case where the write command is received when the magnetic disk is rotated at the rotational speed of the second value and the first position is included in the first area.

4. The magnetic disk device according to claim 2, further comprising
a non-volatile memory, wherein
the third area is provided in the non-volatile memory.

5. The magnetic disk device according to claim 2, further comprising
a non-volatile memory, wherein
the third area includes a fourth area provided in the second area, and a fifth area provided in the non-volatile memory.

6. The magnetic disk device according to claim 5, wherein the controller writes the data to the fifth area in preference to the fourth area.

7. The magnetic disk device according to claim 2, wherein the controller
is capable of operating in any of a first mode of causing the magnetic disk to rotate at the rotational speed of the first value when accessing the magnetic disk with the magnetic head, and a second mode of causing the magnetic disk to rotate at the rotational speed of the second value when accessing the magnetic disk with the magnetic head,
transitions to the second mode in a case where free capacity of the third area exceeds a first threshold, and
transitions to the first mode in a case where the free capacity falls below a second threshold smaller than the first threshold.

8. The magnetic disk device according to claim 2, wherein the setting condition is that there is no unprocessed command in the first mode.

9. The magnetic disk device according to claim 2, wherein the setting condition is that a power mode is in an idle state in the first mode.

10. The magnetic disk device according to claim 2, wherein
a first system area, update being prohibited therein, is provided in the first area, and a second system area being updatable is provided in the second area.

11. The magnetic disk device according to claim 2, wherein
an area, a recording frequency of the magnetic head exceeding a set level in the area, is set as the first area.

12. The magnetic disk device according to claim 11, wherein
set linear recording density is substantially equal between the first area and the second area.

13. The magnetic disk device according to claim 11, wherein
the set level is determined on a basis of an error rate at a time of access.

14. A control method of a magnetic disk device including a magnetic disk, a first area and a second area located on an inner diameter side of the first area being provided therein, a motor rotating the magnetic disk, and a magnetic head, the control method comprising:
receiving a write command from a host;
writing, in a case where a first position that is a position designated as a write destination of data by the write command is included in the first area, the data to the first position by the magnetic head while causing the magnetic disk to rotate at a rotational speed of a first value;
writing, in a case where the first position is included in the second area, the data to the first position by the magnetic head while causing the magnetic disk to rotate at a rotational speed of a second value larger than the first value;
writing the data in a third area different from the first area in a case where the write command is received when the magnetic disk is rotated at the rotational speed of the second value and the first position is included in the first area; and
transferring the data from the third area to the first position in the first area while causing the magnetic disk to rotate at the rotational speed of the first value in a case where a setting condition is satisfied.

15. The control method according to claim 14, wherein the third area is provided in the second area,
the control method further comprising
writing the data into the third area while causing the magnetic disk to rotate at the rotational speed of the second value in a case where the write command is received when the magnetic disk is rotated at the rotational speed of the second value and the first position is included in the first area.

16. The control method according to claim 14, wherein the magnetic disk device further includes a non-volatile memory, and
the third area is provided in the non-volatile memory.

17. The control method according to claim 14, wherein the disk device can operate in any of a first mode of causing the magnetic disk to rotate at the rotational speed of the first value when accessing the magnetic disk with the magnetic head, and a second mode of causing the magnetic disk to rotate at the rotational speed of the second value when accessing the magnetic disk with the magnetic head,
the control method further comprising:
causing the magnetic disk device to transition to the second mode in a case where free capacity of the third area exceeds a first threshold; and
causing the magnetic disk device to transition to the first mode in a case where the free capacity falls below a second threshold smaller than the first threshold.

18. The control method according to claim 14, wherein the setting condition is that there is no unprocessed command in the first mode.

19. The control method according to claim 14, wherein the setting condition is that a power mode is in an idle state in the first mode.

* * * * *